(12) United States Patent
Kweon et al.

(10) Patent No.: US 11,193,676 B2
(45) Date of Patent: Dec. 7, 2021

(54) COOKING APPARATUS, CONTROL METHOD THEREFOR AND DOUBLE PLATE

(71) Applicant: Samsung Electronics Co., Ltd., Suwon-si (KR)

(72) Inventors: Soon-cheol Kweon, Seoul (KR); Joon-hyung Kwon, Seoul (KR); Hong-suk Kim, Seoul (KR); Myung-seob Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 472 days.

(21) Appl. No.: 15/776,610

(22) PCT Filed: Jul. 25, 2016

(86) PCT No.: PCT/KR2016/008121
§ 371 (c)(1),
(2) Date: May 16, 2018

(87) PCT Pub. No.: WO2017/086569
PCT Pub. Date: May 26, 2017

(65) Prior Publication Data
US 2018/0328594 A1 Nov. 15, 2018

(30) Foreign Application Priority Data
Nov. 16, 2015 (KR) .................. 10-2015-0160218

(51) Int. Cl.
*F24C 7/02* (2006.01)
*F24C 7/04* (2021.01)
(Continued)

(52) U.S. Cl.
CPC .............. *F24C 15/24* (2013.01); *F24C 7/02* (2013.01); *F24C 7/043* (2013.01); *F24C 7/08* (2013.01);
(Continued)

(58) Field of Classification Search
None
See application file for complete search history.

(56) References Cited

U.S. PATENT DOCUMENTS 3,731,037 A * 5/1973 Levinson ............. H05B 6/6494
219/756
4,091,252 A * 5/1978 Koinuma ............... H05B 6/642
219/681
(Continued)

FOREIGN PATENT DOCUMENTS

CN 1128335 8/1996
CN 1912473 2/2007
(Continued)

OTHER PUBLICATIONS

Chinese Office Action dated Jan. 7, 2020 in Chinese Patent Application No. 201680066658.X.
(Continued)

*Primary Examiner* — Joseph M. Pelham
(74) *Attorney, Agent, or Firm* — Staas & Halsey, LLP

(57) ABSTRACT

A cooking apparatus is disclosed. The cooking apparatus according to one exemplary embodiment of the present disclosure comprises: an inner wall for forming a cooking chamber; an outer wall for encompassing the inner wall; a microwave generating part for emitting a microwave at a passage, which is a space surrounded by the inner wall and the outer wall; and an absorbing layer absorbing the microwave to be propagated along the passage, so as to emit an infrared ray at the cooking chamber.

14 Claims, 24 Drawing Sheets

(51) Int. Cl.
*F24C 15/08* (2006.01)
*F24C 15/24* (2006.01)
*H05B 6/00* (2006.01)
*H05B 6/64* (2006.01)
*H05B 6/80* (2006.01)
*F24C 7/08* (2006.01)
*H05B 6/70* (2006.01)

(52) U.S. Cl.
CPC .......... *F24C 15/08* (2013.01); *H05B 6/6402* (2013.01); *H05B 6/645* (2013.01); *H05B 6/6494* (2013.01); *H05B 6/705* (2013.01); *H05B 6/707* (2013.01); *H05B 6/708* (2013.01); *Y02B 40/00* (2013.01)

(56) References Cited

U.S. PATENT DOCUMENTS

| | | | |
|---|---|---|---|
| 4,104,957 A * | 8/1978 | Freedman | A47J 31/106 219/689 |
| 4,398,077 A * | 8/1983 | Freedman | H05B 6/6494 219/729 |
| 4,495,392 A * | 1/1985 | Derby | A47J 36/027 219/729 |
| 4,803,324 A * | 2/1989 | Fujii | H05B 6/6482 219/400 |
| 4,870,255 A * | 9/1989 | Fujii | H05B 6/6482 219/400 |
| 4,989,748 A * | 2/1991 | Parr, Jr. | A47G 19/26 219/734 |
| 5,136,133 A * | 8/1992 | Briggs | H05B 6/64 219/730 |
| 5,519,196 A * | 5/1996 | Xu | H05B 6/6494 219/730 |
| 5,587,099 A | 12/1996 | Kuhn et al. | |
| 5,595,673 A | 1/1997 | Ekström et al. | |
| 6,786,634 B2 | 9/2004 | Hashimoto et al. | |
| 6,932,862 B2 | 8/2005 | Daugherty | |
| 6,946,631 B2 * | 9/2005 | Braunisch | H05B 6/6426 219/399 |
| 7,060,942 B2 | 6/2006 | Friedl et al. | |
| 7,145,119 B1 | 12/2006 | Kim et al. | |
| 7,223,950 B2 * | 5/2007 | Nomura | H05B 6/6494 219/679 |
| 7,234,478 B2 | 6/2007 | Kanzaki et al. | |
| 7,498,549 B2 | 3/2009 | Gallivan et al. | |
| 8,164,030 B2 | 4/2012 | Isoda et al. | |
| 8,843,242 B2 | 9/2014 | Burt | |
| 2005/0211705 A1 | 9/2005 | Nomura et al. | |
| 2009/0095740 A1 | 4/2009 | Buchala et al. | |
| 2009/0134152 A1 * | 5/2009 | Sedlmayr | H05B 6/806 219/687 |
| 2009/0230125 A1 | 9/2009 | Kono et al. | |
| 2010/0140259 A1 | 6/2010 | Feng et al. | |
| 2010/0230400 A1 | 9/2010 | Feng et al. | |
| 2011/0002677 A1 | 1/2011 | Cochran et al. | |
| 2011/0147376 A1 | 6/2011 | Ueda et al. | |
| 2012/0097669 A1 | 4/2012 | Sim et al. | |
| 2012/0152939 A1 | 6/2012 | Nobue et al. | |
| 2012/0160844 A1 | 6/2012 | Nobue et al. | |
| 2012/0175363 A1 | 7/2012 | Ron et al. | |
| 2013/0008896 A1 | 1/2013 | Ooomori et al. | |
| 2013/0313250 A1 * | 11/2013 | Ibragimov | H05B 6/6467 219/709 |

FOREIGN PATENT DOCUMENTS

| | | |
|---|---|---|
| CN | 101434752 | 5/2009 |
| CN | 104456648 | 3/2012 |
| EP | 2326141 | 5/2011 |
| EP | 1753266 | 12/2013 |
| JP | 2008-116058 | 5/2008 |
| JP | 2009-24915 | 2/2009 |
| JP | 2011-174668 | 9/2011 |
| JP | 2011-196603 | 10/2011 |
| JP | 2018088363 A * | 6/2018 |
| KR | 1999-008863 | 3/1999 |
| KR | 1999-0047684 | 7/1999 |
| KR | 10-0619794 | 9/2006 |
| KR | 10-2011-0008928 | 1/2011 |
| KR | 10-2012-0071984 | 7/2012 |
| KR | 10-2012-0084887 | 7/2012 |
| KR | 10-2014-0011723 | 1/2014 |
| WO | 90/03716 | 4/1990 |
| WO | 01/52604 | 7/2001 |
| WO | 2009/145460 | 12/2009 |
| WO | 2012/030054 | 3/2012 |

OTHER PUBLICATIONS

Extended European Search Report dated Oct. 16, 2018 in European Patent Application No. 16866522.2.
Chinese Office Action dated May 8, 2019 in Chinese Patent Application No. 201680066658.X.
European Communication dated Oct. 27, 2020 in European Patent Application No. 16866522.2.
International Search Report dated Nov. 10, 2016 in corresponding International Patent Application No. PCT/KR2016/008121.
Written Opinion dated Nov. 10, 2016 in corresponding International Patent Application No. PCT/KR2016/008121.
Korean Office Action dated Sep. 24, 2021 in Korean Patent Application No. 10-2015-0160218 (18 pages including translation).

* cited by examiner

133

(a)

(b)

320-1

320-2

COOKING APPARATUS, CONTROL METHOD THEREFOR AND DOUBLE PLATE

CROSS-REFERENCE TO RELATED APPLICATIONS

This application is a National Phase Application under 35 U.S.C. § 371 of PCT International Patent Application No. PCT/KR2016/008121, filed Jul. 25, 2016 which claims the foreign priority benefit under 35 U.S.C. § 119 to Korean Patent Application No. 10-2015-0160218 filed Nov. 16, 2015, the contents of which are incorporated herein by reference.

TECHNICAL FIELD

Apparatuses and methods consistent with the present disclosure relate to a cooking apparatus, a control method thereof, and a double plate, and more particularly, to a cooking apparatus capable of evenly heating food at a high temperature using infrared rays emitted by irradiating microwaves, a control method thereof, and a double plate.

BACKGROUND ART

Conventional ovens are based on a scheme of convecting hot air within a cooling chamber to cook food by hot air.

In the case of the convection ovens, as capacity of a cooking chamber increases, energy consumption is increased to fill heat capacity of air. Also, there is a limitation (about 230° C.) and a heat flow q flowing between two materials, i.e., air and food, having a temperature difference $\Delta T$ in a limited area A of food is proportional to the temperature difference $\Delta T$, making cooking slow.

In addition, food being cooked collides with hot, dry air to be deprived of a large amount of moisture. Further, hot air convected by a blowing fan disturbs a shape of the food and blows away juice of the food in all directions, degrading the taste of the food and leaving residues or soot on the wall of the oven, causing a sanitation problem and user inconvenience of cleaning the cooking chamber.

DISCLOSURE

Technical Problem

The present disclosure provides a cooking apparatus capable of evenly heating food at a high temperature using infrared rays emitted by irradiating microwaves, a control method thereof, and a laminated plate forming a cooking chamber.

Technical Solution

According to an aspect of the present disclosure, a cooking apparatus includes: an inner wall forming a cooking chamber; an outer wall enclosing the inner wall; a microwave generating unit emitting microwaves to a passage as a space enclosed by the inner wall and the outer wall; and an absorbent layer absorbing the microwaves spread along the passage and emitting infrared rays to the cooking chamber.

In this case, the absorbent layer may be applied to a surface of the inner wall in a direction of the passage.

In this case, the cooking apparatus may further include: a surface protective layer formed of a material allowing the microwaves to be transmitted therethrough and reflecting the infrared rays, and disposed on an upper portion of the absorbent layer.

Meanwhile, the cooking apparatus may further include: an infrared reflective plate reflecting the infrared rays to a surface of the outer wall in a direction of the passage.

Meanwhile, the microwave generating unit may include: a microwave oscillator acceleratedly moving electrons using an electric field; a waveguide guiding microwaves generated by the accelerated motion to the passage; and a stirrer reflecting the microwaves guided to the passage to the surrounding.

Meanwhile, the cooking apparatus may further include: a variable element changing characteristic impedance of the passage in which the microwaves are spread.

Meanwhile, the microwave generating unit may include a waveguide branched to different paths to guide the microwaves emitted from a generation source of the microwaves to different spaces of the passage.

In this case, the passage may be divided into a plurality of rooms enclosing the inner wall, and the waveguide may be branched to spaces of a boundary portion in which two or more of the plurality of rooms are abut on each other, and two or more holes allowing the microwaves to spread therethrough to each of the two or more rooms abut on each other may be formed.

Meanwhile, the microwave generating unit may include a radio frequency (RF) transistor emitting microwaves.

In this case, the cooking apparatus may further include: a controller controlling the RF transistor to change a wavelength of the microwaves within a predetermined range.

Meanwhile, the RF transistor may be provided in plurality, and the plurality of RF transistors may be disposed in different spaces within the passage, and the cooking apparatus may further include: a controller controlling the plurality of RF transistors to emit microwaves having different intensities according to spaces in which the plurality of RF transistors are positioned.

Meanwhile, the cooking apparatus may further include: a plurality of temperature sensors sensing a temperature from a plurality of positions previously installed in the inner wall; and a controller controlling the RF transistor to adjust an intensity of the microwaves emitted on the basis of the temperature sensed by the plurality of temperature sensors.

Meanwhile, the cooking apparatus may further include: a partition positioned between the inner wall and the outer wall and guiding the emitted microwaves to an end of the passage together with the outer wall, wherein the partition includes one or a plurality of slots allowing the guided microwaves to pass therethrough to the absorbent layer.

In this case, the partition may include a slot antenna including a plurality of slots having a uniform or non-uniform size according to predetermined patterns.

In this case, the slot antenna may include a plurality of slots increased in size in a direction away from a position from which the microwaves arranged along a radial or lattice-like pattern are emitted to the passage, according to a radial or lattice-like pattern.

Meanwhile, the cooking apparatus may further include: a dielectric material having a predetermined permittivity filling the passage.

Meanwhile, the cooking apparatus may further include: a shelf disposed within the cooking chamber and absorbing microwaves to emit infrared rays and a second microwave generating unit irradiating microwaves toward the shelf.

Meanwhile, the cooking apparatus may further include: a heating line emitting heat energy to the bottom of the cooking chamber.

Meanwhile, the microwave generating unit may further include: a valve switching a path to which the emitted microwaves are spread, to the cooking chamber.

Meanwhile, the cooking apparatus may further include: a door opening and closing the cooking chamber, wherein the door may allow visible rays to be transmitted therethrough and reflect infrared rays.

Meanwhile, the inner wall may form an upwardly convex hemispherical ceiling.

Meanwhile, a laminated plate forming the cooking chamber of the cooking apparatus according to an exemplary embodiment of the present disclosure may include a base substrate shaped according to a shape of the cooking chamber, a microwave absorbent layer absorbing microwaves incident from the outside to emit infrared rays and stacked (or laminated) on a surface of the base substrate, and a surface protective layer stacked on the microwave absorbent layer.

In this case, the base substrate may be formed of ceramics having high emissivity with respect to infrared rays, the microwave absorbent layer may be formed by applying a compound obtained by mixing metallic powder having characteristics of absorbing microwaves and emitting heat and an inorganic binder to the base substrate, and the surface protective layer may be formed of a non-metal material having high transmittance with respect to microwaves incident from the outside.

In this case, the microwave absorbent layer may include at least one of Ca, $Al_2O_3$, ZnO, FeO, $Fe_2O_3$, $TiO_2$, SiC, WC, Co, and carbon steel.

According to another aspect of the present disclosure, a method for controlling a cooking apparatus includes: receiving an instruction for starting heating of a cooking chamber, generating microwaves in response to the instruction, emitting the generated microwaves to a passage enclosed by an inner wall forming the cooking chamber and an outer wall covering the inner wall, and absorbing the emitted microwaves and emitting infrared rays to the cooking chamber.

In this case, in the generating, microwaves varied in wavelength within a predetermined range may be generated.

Meanwhile, the control method may further include: sensing a temperature at a plurality of positions installed on the inner wall and adjusting intensity of the emitted microwaves on the basis of the sensed temperature.

Advantageous Effects

According to various exemplary embodiments described above, since the cooking apparatus transfers heat to heat food to be cooked in the form of radiation of infrared rays, the food may be quickly cooked at a temperature higher than that of the convection type heating.

A fast cooking speed makes a surface of the food crispy and keeps moisture inside the food, bettering the taste of the food.

Since no hot air is generated, cleaning of the cooking chamber is facilitated.

A microwave oven in which microwaves are directly irradiated to food has a problem of uneven heating of the food, but the cooking apparatus of the present disclosure may heat the food evenly. In addition, the cooking apparatus of an exemplary embodiment of the present disclosure eliminates the possibility of leakage of microwaves to the outside as in a microwave oven, improving safety for the user's health.

BEST MODE

Mode for Invention

Hereinafter, exemplary embodiments of the present disclosure will be described in detail with reference to the accompanying drawings. In describing the present disclosure, if a detailed explanation for a related known function or construction is considered to unnecessarily divert the gist of the present disclosure, such explanation has been omitted but would be understood by those skilled in the art.

Figure 1:
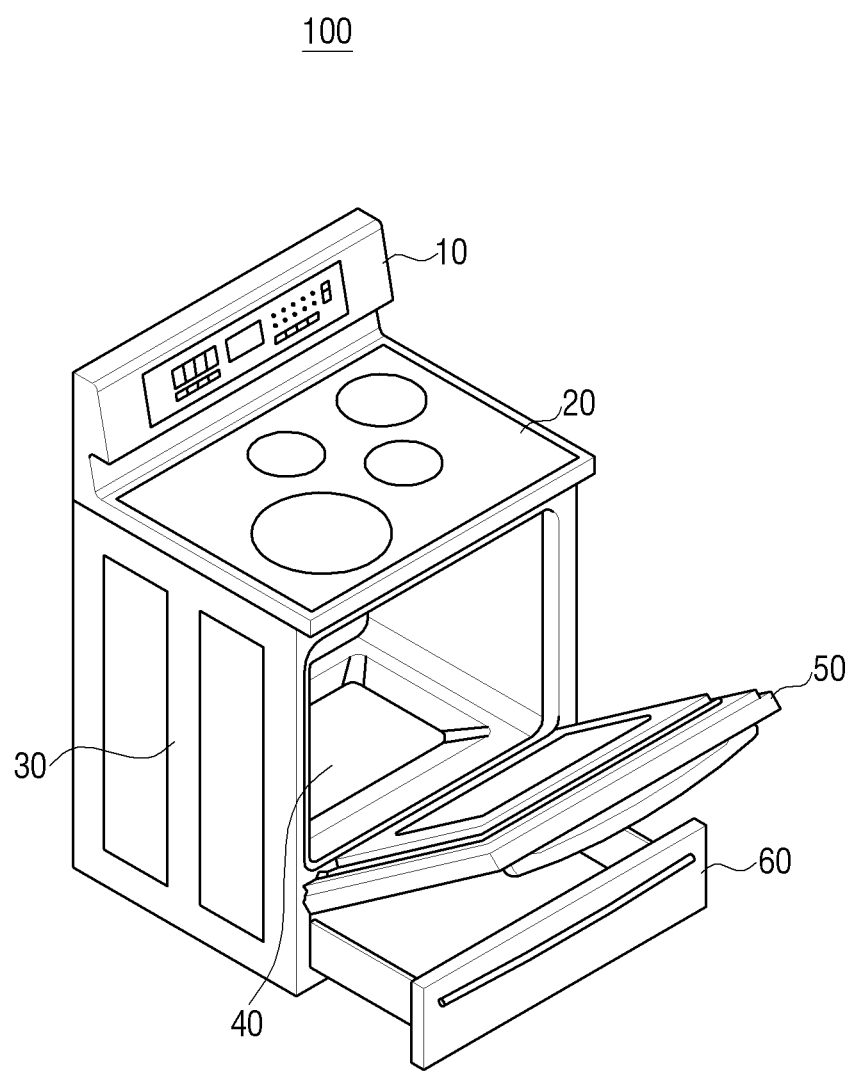
FIG. 1 is a view illustrating an appearance of a cooking apparatus according to an exemplary embodiment of the present disclosure.

FIG. 1 is a view illustrating an appearance of a cooking apparatus according to an exemplary embodiment of the present disclosure.

Referring to FIG. 1, a cooking apparatus 100 includes an operating unit 10, an induction cooktop 20, a main body 30, a cooking chamber 40, a door 50, and a drawer 60.

The operating unit 10 receives a user's instruction (or command) for controlling the cooking apparatus 100. Specifically, the operating unit 10 may receive a user's instruction to perform a function of the cooking apparatus 100 for heating food.

The operating unit 10 may receive a control instruction for controlling the induction cooktop 20. For example, the operating unit 10 may receive a user input for selecting any one of a plurality of burners on which a cooker is to be placed and a heating temperature of the selected burner.

The operating unit 10 may receive a control instruction for controlling the main body 30. Hereinafter, the main body 30 will be referred to as an oven for heating food in an airtight space. Specifically, the operating unit 10 may receive an instruction for controlling the oven 30 of the cooking apparatus 100. For example, the operating unit 10 may receive an instruction for starting heating of the oven 30. Here, the heating start instruction includes an instruction for starting a cooking function for cooking food and a cleaning function for carbonizing residual organic matters within the cooking chamber 40 to a high temperature.

The operating unit 10 may receive a user input for setting a mode corresponding to any one of baking, broiling, roasting, steaming, microwave oven, thawing, fermentation, warm-keeping, and drying. The modes listed above are illustrative and a mode may be added or any of the mentioned modes may be omitted. The baking mode is a mode for cooking food such as pie, cookie, or bread. The broiling mode is a mode for baking food of meat such as beef, pork chops, lamb chops, and fish. The roasting mode is a mode for baking a whole corner of uncooked meat, such as cattle, pig, poultry, sheep, and the like, as a whole. The steam mode is a function of heating food, while supplying moisture to the food, which may be used in a cooking method such as boiling, blanching, or steaming. The microwave oven mode is a mode in which microwaves are irradiated toward food to heat the same. The thawing mode is a mode for performing heating to melt frozen food. The fermentation mode is a mode to perform heating for fermentation of food such as dough, sikhye (a sweet rice drink), and yogurt, which require fermentation. The warm-keeping mode is a mode for performing heating to maintain a temperature of cooked food for a predetermined time. The drying mode is a mode for performing heating to remove moisture from food itself.

The operating unit 10 may receive a reservation setting instruction for starting cooking or cleaning at an input time or an instruction for setting a timer to sound an alarm at an input time.

The operating unit 10 may be implemented in various manners. In an example, the operating unit 10 may include a touch sensor that senses a touch of a user, together with a display and a light emitting unit that display a state of the cooking apparatus 100 and a front surface of the operating unit 10 may be covered with integrated tempered glass or transparent plastic.

The induction cooktop 20 provides a place where a cooker such as pots, pans, and the like, may be placed to cook. The induction cooktop 20 includes one or a plurality of burners. An electric wire included in the burner may induce a current to a metal plate disposed on the bottom of the cooker or at an upper portion of the burner to generate heat based on electrical resistance from a rotating induced current. The induction cooktop 20 is an optional component of the cooking apparatus 100 and may not be included in the cooking apparatus 100.

The main body 30 forms an appearance and an outer wall of the cooking apparatus 100. The main body 30 forms the cooking chamber 40 as a space in which the respective components 10, 20, 50 and 60 of the cooking apparatus 100 are attached and combined and into which food is introduced. The main body 30 may include a machine room that is not exposed to the outside. The machine room may include an electrically connected circuit device for supplying power to and controlling each component of the cooking apparatus 100. In addition, a controller for performing an operation for control may be mounted on the circuit device to control each component according to an instruction input from the user or stored data.

The cooking chamber 40 is a space for holding food (or cooking item) to be cooked. The cooking chamber 40 may be provided with lighting, a steam jetting port, a plurality of trays into which shelves are inserted, a heating line, and the like.

The door 50 opens and closes the cooking chamber 40. Specifically, the door 50 may be hinged to the main body 30 to open and close one side of the cooking chamber 40. The door 50 may include a transparent material so that the inside of the cooking chamber 40 may be visible even with the door 50 closed. The door 50 may have a handle that the user may grip with his/her hand and may include a latch that may be connected to the main body 30 such that food may be cooked in a state in which the door 50 is slightly open, rather than being completely closed.

The drawer 60 is a separate space for keeping cooked food warm. The drawer 60 may keep first cooked food warm, while other food is being cooked in the cooking chamber 40.

The cooking apparatus 100 emits infrared rays to the cooking chamber 40. Specifically, the cooking apparatus 100 may emit infrared rays for cooking food into the cooking chamber 40 to perform heating by radiation. A specific structure and internal configuration thereof will be described hereinafter with reference to the following drawings.

Figure 2:
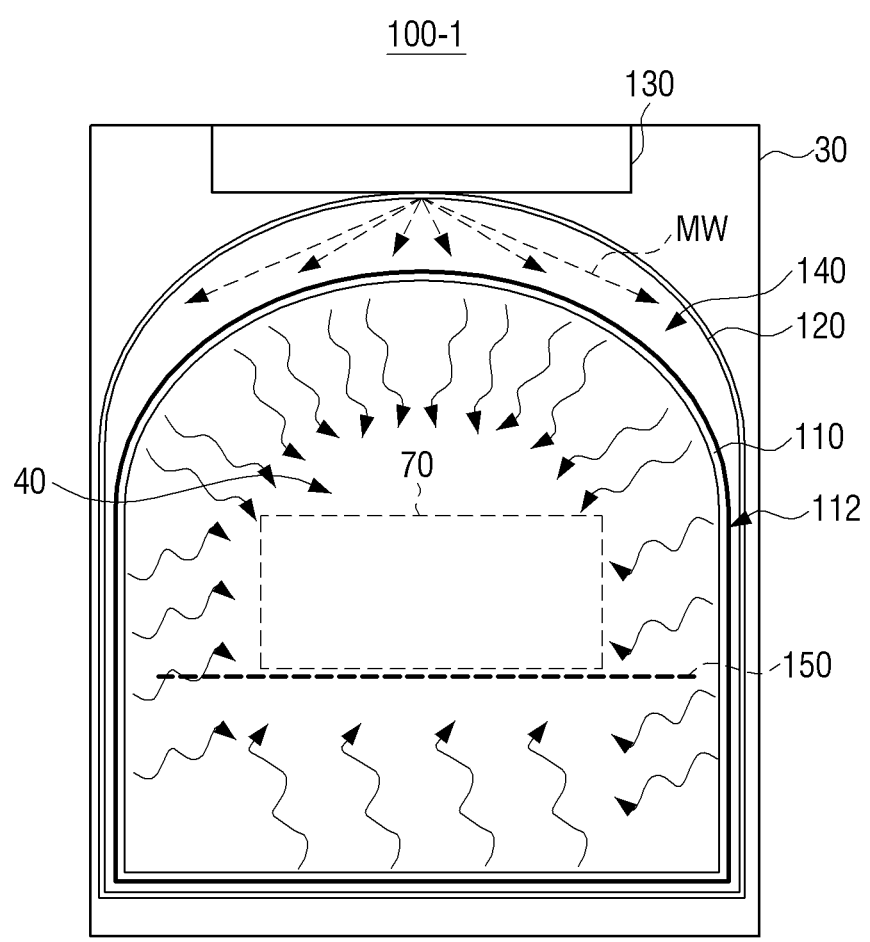
FIG. 2 is a view illustrating a structure and a configuration of a cooking apparatus according to a first exemplary embodiment of the present disclosure.

FIG. 2 is a view illustrating a structure and a configuration of a cooking apparatus according to a first exemplary embodiment of the present disclosure.

Referring to FIG. 2, a cooking apparatus 100-1 according to the first exemplary embodiment includes an inner wall 110, an outer wall 120, and an absorbent layer 112. Also, in FIG. 2, a cooking item 70 as a heating target and a shelf 150 allowing the cooking item 70 to be placed in the cooking chamber 40 are further illustrated. The above-described components will be described as being provided inside the main body 30 following the example of the cooking apparatus 100 of FIG. 1.

The inner wall 110 forms the cooking chamber 40. Specifically, the inner wall 110 may form the cooking chamber 40 as a space for accommodating and heating the cooking item 70. The inner wall 110 may transmit heat of the absorbent layer 112 to the cooking chamber 40. Details thereof will be described hereinafter with reference to FIG. 8.

The outer wall 120 encloses the inner wall 110. Specifically, the outer wall 120 is formed to be larger than the inner wall 110 forming the cooking chamber 40 so that the inner wall 110 may be enclosed in the outer wall 120. Here, the outer wall 120 may be designed to enclose the inner wall 110 at a certain distance from the inner wall 110.

The absorbent layer 112 absorbs microwaves. Specifically, the absorbent layer 112 absorbs energy of microwaves in response thereto and may emit thermal energy. The absorbent layer 112 may be a material reactive with electromagnetic waves, and more particularly, a material that absorbs more efficiently in a frequency band of microwaves emitted from a microwave generating unit 130. For example, the absorbent layer 112 may be a material obtained by mixing at least one of materials such as calcium, an aluminum oxide, an iron oxide, a cobalt oxide, a silicon carbide, and the like, in a predetermined composition ratio.

The absorbent layer 112 emits infrared rays (IR). Specifically, the absorbent layer 112 may absorb electromagnetic energy of the emitted microwaves and emit thermal energy in an infrared (IR) ray form. Here, the infrared ray (IR) emitted from the absorbent layer 112 may be transmitted to the cooking chamber 40.

The infrared ray (IR) emitted from the absorbent layer 112 may have a predetermined frequency band. Specifically, the absorbent layer 112 may emit a mid-infrared (MIR) ray and a far-infrared (FIR) ray. Here, the mid-infrared ray refers to an infrared ray having a wavelength ranging from 1.4 µm to less than 3.0 µm, and the far-infrared ray refers to an infrared ray having a wavelength ranging from 3.0 µm to less than 1000 µm.

Carbohydrates, fats and proteins are typical organic matters that make up most food. Water is a mineral that is contained in a relatively high ratio in most food. Hydroxyl (O—H) present in water and sugar absorbs wavelengths of 2.7 to 3.3 µm. Carbon-carbon (C—C) single bonds present in all of carbohydrates, proteins and lipids absorb wavelengths from 3.25 to 3.7 µm. The ester (O—C=O) present in neutral fats absorbs wavelengths from 5.71 to 5.76 µm. The amide (N—C=O) present in the protein absorbs wavelengths from 2.83 to 3.33 µm. Amines (N—H) present in the amino acids constituting the protein absorb wavelengths of 2.83 to 3.33 µm. Carbon-carbon (C=C) double bonds present in unsaturated fats absorb wavelengths from 4.44 to 4.76 µm. Accordingly, the absorbent layer 112 may emit infrared rays having wavelengths of 2 to 6 µm, which is absorbed by chemical bonds constituting most of the foods listed above.

The absorbent layer 112 may be applied to a surface of the inner wall 110. In particular, the absorbent layer 112 may be applied to the surface of the inner wall 110 in a direction of a passage 140 (i.e., facing the outer wall 120). For the application of the absorbent layer 112, a material constituting the absorbent layer 112 may be formed of a liquid mixed with a powder of fine particles or a liquid solute or may be formed as a thin film. To apply the absorbent layer 112 to the inner wall 110, various methods such as a uniform spraying method, a method of inducing polarity to particles to be sprayed and spraying the polarity-induced particles to electrostatically deposit the same to the substrate, and the like, may be used.

A heat flow based on the infrared radiation method is proportional to a biquadrate of a temperature difference between two materials. Thus, it enables rapid heating, compared with the existing oven which heats a cooking item based on convection and conduction by heating air.

The microwave generating unit 130 emits microwaves MW. Specifically, the microwave generating unit 130 may emit microwaves, which are electromagnetic waves having a predetermined wavelength to be absorbed by the absorbent layer 112. The microwave generating unit 130 emits microwaves MW to the passage. In the description of the present disclosure, the passage is used to refer to a space enclosed by the inner wall 110 and the outer wall 120.

The microwave generating unit 130 may be implemented as a magnetron. Specifically, the microwave generating unit 130 may be implemented as a magnetron which emits electrons (cathode) into the air, forms an electric field and a magnetic field in a direction perpendicular to the periphery of the electrons, and generates an electromagnetic wave from electrons making a rotationally circular motion by a force F based on the vertical electric field and magnetic flux B based on the magnetic field. In another exemplary embodiment, the microwave generating unit 130 may be implemented as an RF transistor. Specifically, the microwave generating unit 130 maybe implemented as a solid-state RF device as a semiconductor device that generates electromagnetic waves having a frequency corresponding to microwaves. In case where the microwave generating unit 130 is implemented as an RF transistor, the microwave generating unit 130 may be manufactured in a lightweight and miniaturized package in combination with an MEMS technology, obtaining an advantage of space, as compared with the magnetron in terms of manufacturing of the cooking apparatus 100.

The above-described cooking apparatus 100 may output a high temperature with high power efficiency and may cook food more delicious and even, as compared with the conventional convection ovens.

FIG. 3 is a view illustrating structures and configurations of a cooking apparatus according to second to fourth exemplary embodiments of the present disclosure.

Figure 3A:
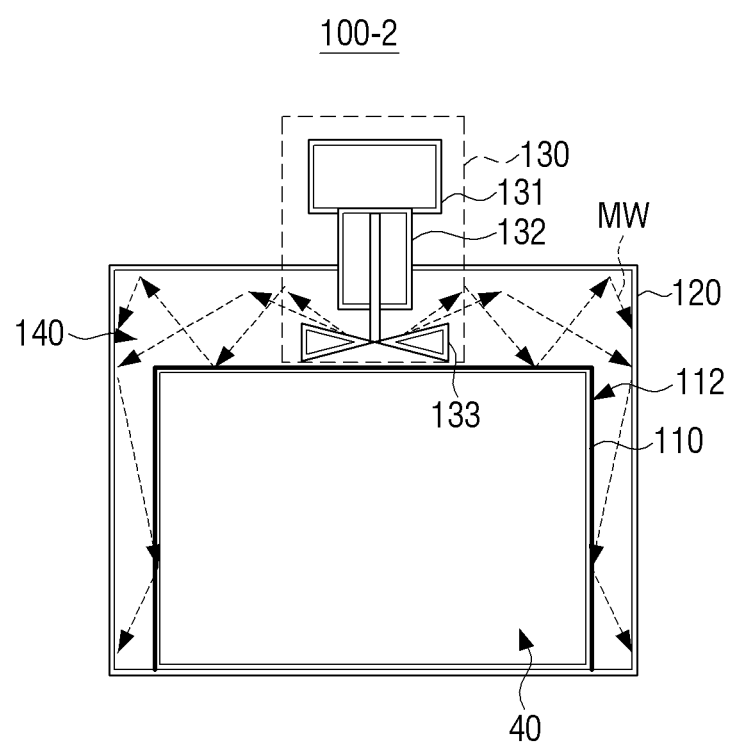
FIGS. 3A-3C are views illustrating structures and configurations of a cooking apparatus according to second to fourth exemplary embodiments of the present disclosure.
Figure 3B:
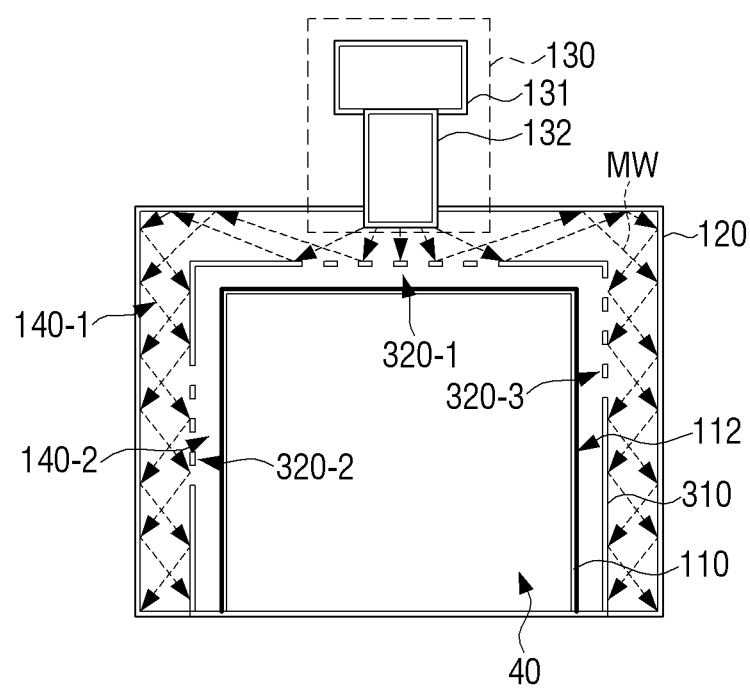
Figure 3C:
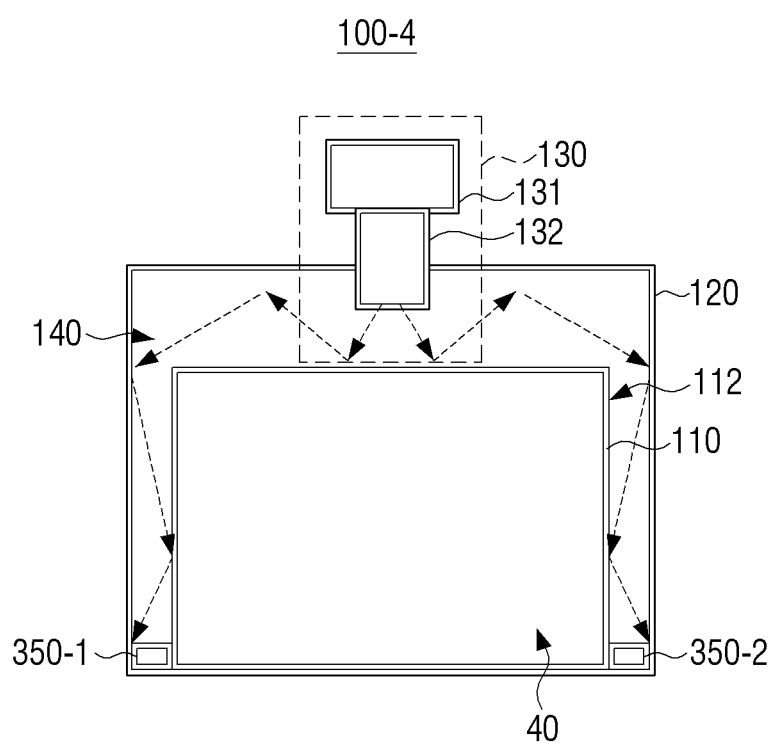

FIGS. 3A to 3C illustrate an example of a structure for uniform heating of food (or a cooking item). Referring to FIG. 3A, the cooking apparatus 100-2 according to the second exemplary embodiment includes an inner wall 110, an absorbent layer 112, an outer wall 120, and a microwave generating unit 130. Here, the structure and function of the inner wall 110, the absorbent layer 112, and the outer wall 120 are the same as those of the inner wall 110, the absorbent layer 112 and the outer wall 120 of FIG. 2, and thus, redundant descriptions will be omitted.

The microwave generating unit 130 includes a microwave oscillator 131, a waveguide 132, and a stirrer 133. The microwave oscillator 131 acceleratedly moves electrons emitted into the air using an electric field. Specifically, the microwave oscillator 131 may apply an electric field perpendicular to the magnetic field formed by a magnet to the electrons in the air to rotate the electrons according to the Lorentz principle. In an example, the microwave oscillator 131 may be implemented as the magnetron (MWO) described above. A high-speed rotational motion of the electrons generates an electromagnetic wave MW.

The waveguide 132 guides a spreading direction (or a propagation direction) of the microwave to the passage 140. More specifically, the waveguide 132 may reflect the microwaves MW emitted from the microwave oscillator 131 to spread the microwaves MW toward the passage 140. The waveguide 132 may be formed of a metal having various shapes such as a cylindrical shape or a coaxial linear shape.

The stirrer 133 reflects the microwaves MW. Specifically, the stirrer 133 may reflect the microwaves MW guided to the passage 140 along the waveguide 132 to the surroundings.

The stirrer 133 may be disposed at an outlet of the waveguide 132 through which the microwaves MW are emitted. The stirrer 133 may rotate so that the microwaves MW may be dispersed evenly. The stirrer 133 may have various types of metal blades. Here, the stirrer 133 of the present exemplary embodiment may be designed to evenly spread the microwaves MW laterally in the passage 140 between the outer wall 120 and the inner wall 110, compared with a stirrer used in conventional microwave oven configured to concentrate microwaves downwards from the ceiling of the cooking chamber toward a rotary dish on the bottom.

The cooking apparatus 100-2 according to the second exemplary embodiment described above may evenly spread the microwaves MW evenly along the passage 140 by the stirrer 133 to uniformly heat the inside of the cooking chamber 40.

Referring to FIG. 3B, a cooking apparatus 100-3 according to the third exemplary embodiment includes an inner wall 110, an outer wall 120, an absorbent layer 112, a microwave generating unit 130, and a partition 310. Structures and functions of the inner wall 110, the outer wall 120, and the absorbent layer 112 are the same as those of the inner wall 110, the outer wall 120 and the absorbent layer 112 of FIG. 2, and thus, redundant descriptions thereof will be omitted.

The microwave generating unit 130 includes a microwave oscillator 131 and a waveguide 132. Structures and functions of the microwave oscillator 131 and the waveguide 132 are the same as those of the microwave oscillator 131 and the waveguide 132 of FIG. 3A, and thus, redundant descriptions thereof will be omitted. Meanwhile, although the stirrer 133 of FIG. 3A is omitted in FIG. 3B, the stirrer 133 may further be included at the time of implementation.

The partition 310 is formed of a material that reflects microwaves MW. The partition 310 is positioned between the inner wall 110 and the outer wall 120. The partition 310 forms a wall along the passage 140 to divide the passage 140 into an outer passage 140-1 adjacent to the outer wall 120 and an inner passage 140-2 adjacent to the inner wall 110.

The microwaves MW emitted from the microwave generating unit 130 travel along the outer passage 140-1. Specifically, the outer wall 120 and the partition 310 guide the microwaves MW to the end of the passage 140-1.

One or a plurality of slot antennas 320-1, 320-2, and 320-3 are formed in the partition 310. Specifically, the partitions 310 may have the slot antennas 320-1, 320-2, and 320-3, which are small holes for diffracting the microwaves MW such that the microwaves MW are evenly incident to the absorbent layer 112. The plurality of slot antennas 320-1, 320-2, and 320-3 may be formed in uniform positions on the partition 310 at equal intervals around the absorbent layer 112 or may be formed in the entire partition 310.

The microwaves MW guided along the outer passage 140-1 may pass through the slot antennas 320-1, 320-2 and 320-3 formed in the partition 310 to reach the absorbent layer 112 applied to the inner wall 110. Here, the microwaves MW are diffracted while passing through the holes of the narrow slot antennas 320-1, 320-2 and 320-3. The absorbent layer 112 absorbs the microwaves MW passing through the slot antennas 320-1, 320-2 and 320-3 and emits infrared rays IR to the cooking chamber 40.

In the cooking apparatus 100-3 according to the third exemplary embodiment as described above, the microwaves MW may evenly reach the end portion of the passage 140-1 by virtue of the partition 310 and the microwaves MW of uniform intensity reach the absorbent layer 112 through the slot antennas 320-1, 320-2, and 320-3 formed in places, enabling uniform heating of the cooking chamber 40.

Referring to FIG. 3C, a cooking apparatus 100-4 according to the fourth exemplary embodiment includes an inner wall 110, an outer wall 120, an absorbent layer 112, a microwave generating unit 130, and impedance converting units 350-1 and 350-2. Structures and functions of the inner wall 110, the outer wall 120 and the absorbent layer 112 are the same as those of the inner wall 110, the outer wall 120 and the absorbent layer 112 of FIG. 2, and thus, redundant descriptions thereof will be omitted.

The microwave generating unit 130 includes a microwave oscillator 131 and a waveguide 132. Structures and functions of the microwave oscillator 131 and the waveguide 132 are the same as those of the microwave oscillator 131 and the waveguide 132 of FIG. 3A, and thus, redundant descriptions thereof will be omitted. Although the stirrer 133 of FIG. 3A is omitted in FIG. 3B, the stirrer 133 may further be included at the time of implementation.

The impedance converting units 350-1 and 350-2 change impedance of the passage 140. Specifically, the impedance converting units 350-1 and 350-2 may change impedance regarding microwaves in the passage 140 formed by the inner wall 110 and the outer wall 120.

A waveguide transferring electromagnetic waves has characteristic impedance. In addition, a shape of a given structure of the waveguide affects the way in which the electromagnetic waves travel. That is, due to the structure of the waveguide, a mode in which energy of electromagnetic waves of a specific frequency concentrated on some spaces occurs. Based on this theory, there is also a mode in an environment of the cooking apparatus 100-4 in which microwaves generated by the microwave generating unit 130 are spread to the entire area of the inner wall 110 through the passage 140. Energy of microwaves concentrating on several spaces may cause imbalance of infrared rays generated in the absorbent layer 112 according to the modes.

The impedance converting units 350-1 and 350-2 may change impedance of the passage 140 such that a position of the generated mode is changed. Similarly, the impedance converting units 350-1 and 350-2 may provide the same effect as that obtained when a length or a width of the passage 140 is changed.

The impedance converting units 350-1 and 350-2 may include an electrically variable element. Specifically, the impedance converting units 350-1 and 350-2 may include a variable element of an electric circuit that may affect the characteristic impedance of the passage 140. The impedance converting units 350-1 and 350-2 may continuously change impedance of the passage 140 during an operational state of the cooking apparatus 100-4 to heat food.

In another exemplary embodiment, the impedance converting units 350-1 and 350-2 may be implemented as a stub which may be moved in position to be connected in parallel to the outer wall 120, a waveguide window positioned in the middle of the passage 140 through which microwaves pass and changed in a width or moved in position, and a conductor rod varied in length inserted into the passage 140 from the outer wall 120.

In FIG. 3C, it is illustrated that the cooking apparatus 100-4 includes two impedance converting units 350-1 and 350-2, but the present disclosure is not limited thereto and one or three or more impedance converting units may be included. Also, it is illustrated that the impedance converting units 350-1 and 350-2 are disposed at the end of the passage 140 of the cooking apparatus 100-4, but the present disclosure is not limited thereto and the impedance conversion units 350-1 and 350-2 may be disposed in any space of the passage 140.

In the cooking apparatus 100-4 according to the fourth exemplary embodiment described above, microwaves MW having the uniform intensity reaches the absorbent layer 112 by shaking the mode in the passage 140 using the impedance converting units 350-1 and 350-2, thereby enabling uniform heating of the cooking chamber 40.

FIG. 4 is a view illustrating structures and configurations of a cooking apparatus according to fifth to seventh exemplary embodiments of the present disclosure.

Figure 4A:
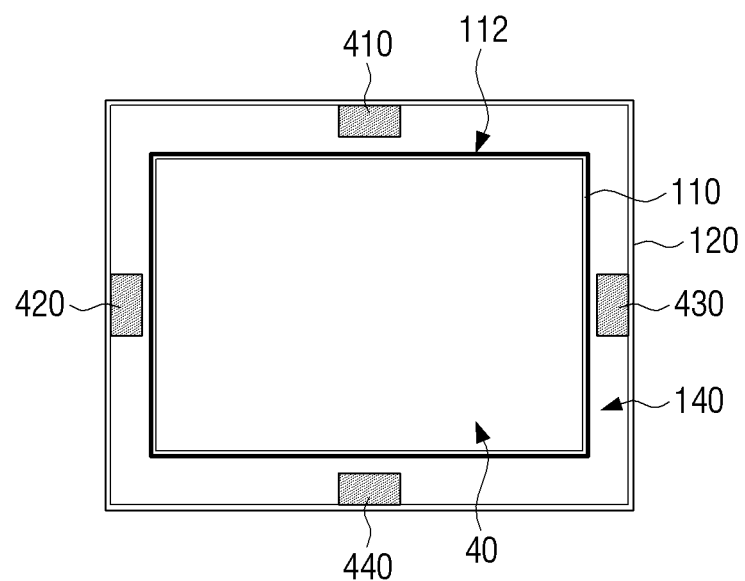
FIGS. 4A-4C are views illustrating structures and configurations of a cooking apparatus according to fifth to seventh exemplary embodiments of the present disclosure.

Referring to FIG. 4A, a cooking apparatus 100-5 of the fifth exemplary embodiment includes an inner wall 110, an outer wall 120, an absorbent layer 112, and a plurality of RF transistors 410, 420, 430, and 440. Structures and functions of the inner wall 110, the outer wall 120 and the absorbent layer 112 are the same as those of the inner wall 110, the outer wall 120 and the absorbent layer 112 of FIG. 2, and thus, redundant descriptions will be omitted.

The RF transistors 410, 420, 430, and 440 are semiconductor devices that emit microwaves, and are also referred to as solid-state RF devices. The RF transistors 410, 420, 430, and 440 manufactured using at least one of MEMS technology, integrated circuit technology, and packaging technology may emit microwaves of a frequency according to characteristics of a circuit designed therein.

The plurality of RF transistors 410, 420, 430, and 440 are disposed around the absorbent layer 112. Specifically, the plurality of RF transistors 410, 420, 430, and 440 are disposed in the passage 140 and may be disposed around the inner wall 110 coated with the absorbent layer 112.

In the cooking apparatus 100-4 of the fifth exemplary embodiment described above, efficiency of energy and space may be increased and the cooking chamber 40 may be evenly heated using the RF transistors 410, 420, 430, and 440.

Figure 4B:
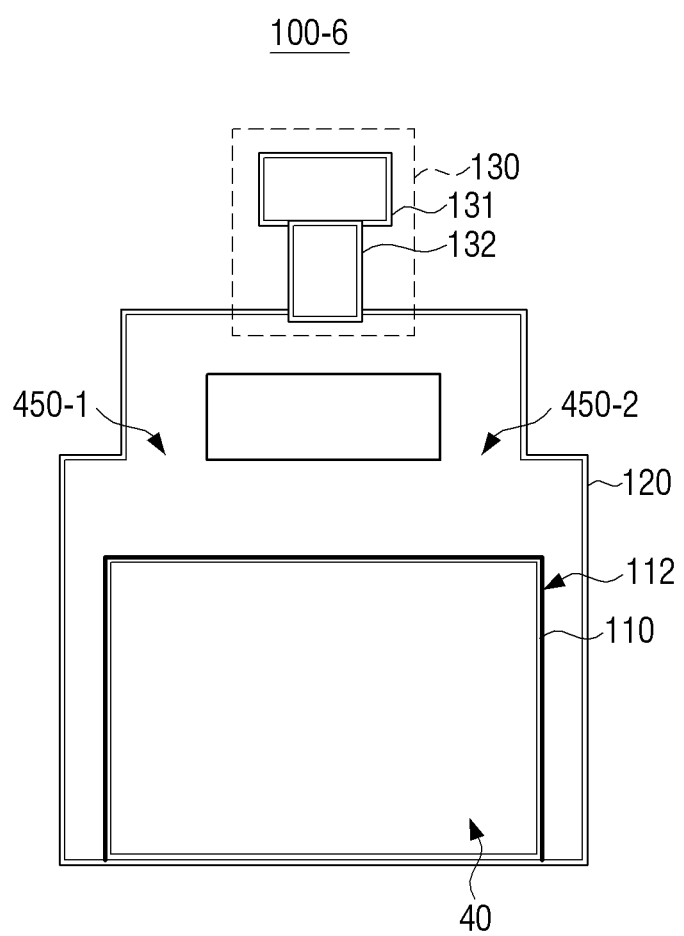

Referring to FIG. 4B, a cooking apparatus 100-6 of the sixth exemplary embodiment includes an inner wall 110, an outer wall 120, an absorbent layer 112 on the inner wall 110, and a microwave generating unit 130. Structures and functions of the inner wall 110, the outer wall 120, and the absorbent layer 112 are the same as those of the inner wall 110, the outer wall 120 and the absorbent layer 112 of FIG. 2 or 3, and thus, redundant descriptions thereof will be omitted.

The microwave generating unit 130 includes a microwave oscillator 131 and a waveguide 132. Structures and functions of the microwave oscillator 131 and the waveguide 132 are the same as those of the microwave oscillator 131 and the waveguide 132 of FIG. 3, and thus, redundant descriptions thereof will be omitted. In FIG. 4B, the microwave oscillator 131 does not include the stirrer 133 of FIG. 3A, but the stirrer 133 may be added at the time of implementation.

The cooking apparatus 100-6 includes a plurality of paths 450-1 and 450-2 through which microwaves enter the passage 140. Specifically, the microwave generating unit 130 may further include an extended waveguide for guiding microwaves to enter different spaces of the passage 140 toward the inner wall 110. In other words, the microwave generating unit 130 includes a waveguide branch pointed into the different paths 450-1 and 450-2 so that microwaves emitted from the microwave oscillator 131 may be guided to the different spaces of the passage 140.

In the cooking apparatus 100-6 according to the sixth exemplary embodiment, since microwave enters the various spaces of the passage, the cooking chamber 40 may be heated more evenly, as compared with a case where there is one path to enter.

Figure 4C:
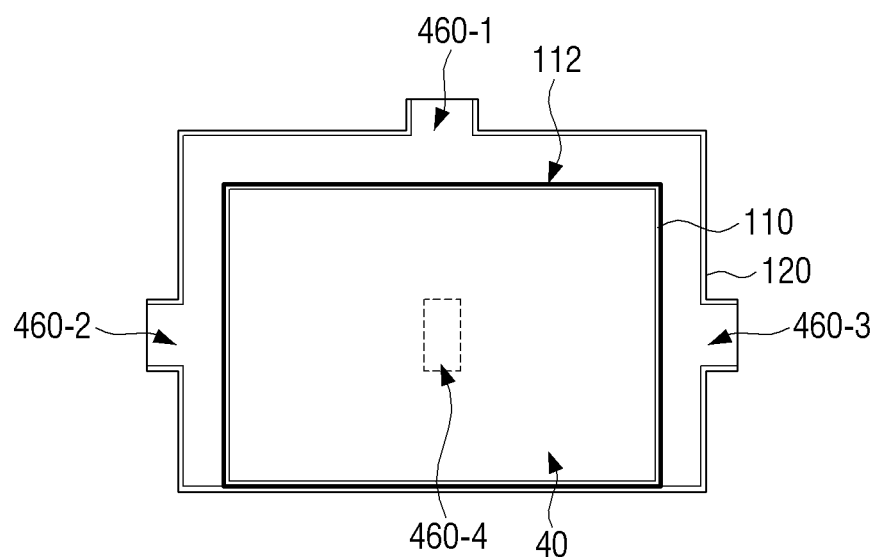

Referring to FIG. 4C, a cooking apparatus 100-7 according to the seventh exemplary embodiment includes an inner wall 110, an outer wall 120, and an absorbent layer 112 on the inner wall 110. Structures and functions of the inner wall 110, the outer wall 120 and the absorbent layer 112 are the same as those of the inner wall 110, the outer wall 120 and the absorbent layer 112 of FIG. 4B, and thus, redundant descriptions thereof will be omitted. Meanwhile, the cooking apparatus 100-7 includes one or a plurality of microwave generating units 130 of FIG. 4B. However, the microwave generating unit 130 of FIG. 4B is omitted in FIG. 4C for the purposes of simplicity.

The cooking apparatus 100-7 includes a plurality of paths 460-1, 460-2, 460-3, and 460-4 through which microwaves enter the passage 140. Specifically, the microwave generating unit 130 may further include an extended waveguide for guiding microwaves to enter different spaces of the passage 140 toward each of the plurality of surfaces of the inner wall 110. In the example of FIG. 4C, the cooking apparatus 100-7 has a structure of a square cooking chamber 40, and the extended waveguide may guide microwaves from the microwave generating unit 130 to different spaces of the passage 140 to be oriented toward four surfaces of a left surface, a right surface, a rear surface, and an upper surface, excluding a front surface in which the door is installed and a bottom surface of the inner wall 110.

To sum up, the microwave generating unit (not shown) may include the waveguide branch pointed to the different paths 460-1, 460-2, 460-3, and 460-4 to guide microwaves emitted from the microwave oscillator to different spaces of the passage 140 corresponding to the respective surfaces of the inner wall 110.

In the cooking apparatus 100-7 according to the seventh exemplary embodiment of the present disclosure described above, since microwaves enters the various spaces of the passage toward the respective surfaces of the inner wall, the cooking chamber 40 may be more evenly heated.

FIG. 5 is a view illustrating structures and configurations of a cooking apparatus according to an eighth exemplary embodiment of the present disclosure.

Figure 5A:
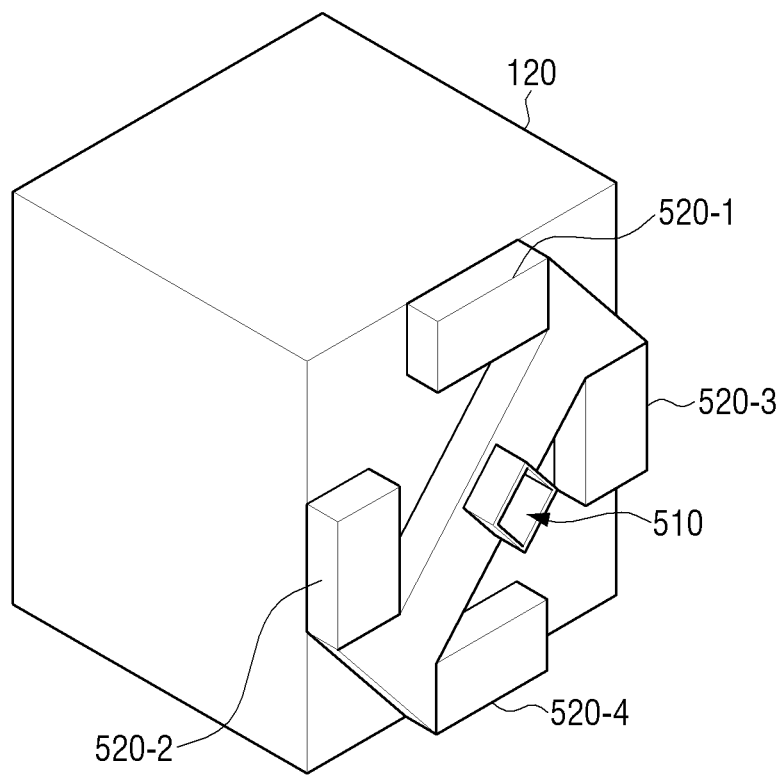
FIGS. 5A-5D are views illustrating structures and configurations of a cooking apparatus according to an eighth exemplary embodiment of the present disclosure.

Referring to FIG. 5A, FIG. 5A is a perspective view illustrating the rear side of a cooking apparatus 100-8. The cooking apparatus 100-8 includes an inner wall 110, an outer wall 120, and an absorbent layer 112 on the inner wall 110, similar to the cooking apparatus of the previous exemplary embodiments. A waveguide extending from a microwave generating unit (not shown) is disposed on a rear surface of the outer wall 120.

Specifically, microwaves generated by the microwave generating unit (not shown) enter an inlet 510 of a waveguide. Then, microwaves are spread to four branch points 520-1, 520-2, 520-3, and 520-4 of the waveguide.

Figure 5B:
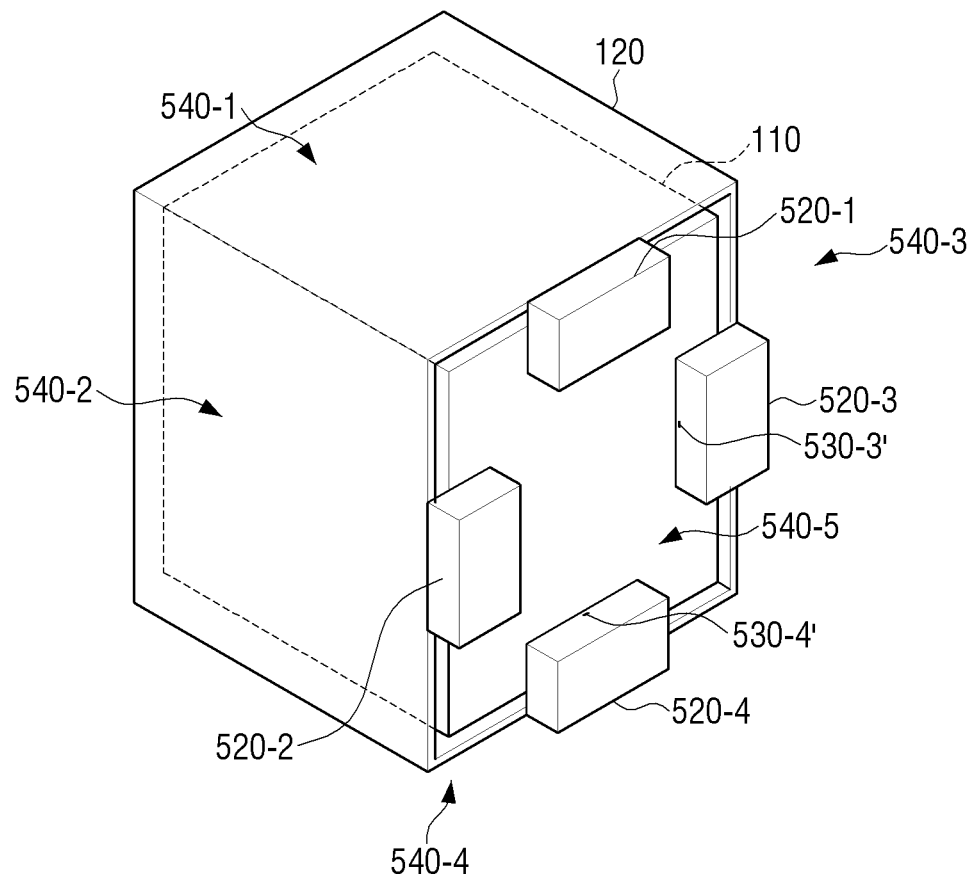

Referring to FIG. 5B, FIG. 5B is a perspective view of a cooking apparatus 100-8 in which a rear surface of the outer wall 120 of the cooking apparatus 100-8 and a part of the extended waveguide are removed for the purpose of description of the structure. Four branch points 520-1, 520-2, 520-3, and 520-4 are recessed to the outer wall 120 to abut the inner wall 110. Each of the branch points 520-1, 520-2, 520-3, and 520-4 has holes 530-3' and 530-4' through which guided microwaves are emitted to different spaces of the passage 140. The passage 140 as a space enclosed by the inner wall 110 and the outer wall 120 is divided into a plurality of rooms 540-1, 540-2, 540-3, 540-4, and 540-5. In an example, the passage 140 may be divided into five rooms 540-1, 540-2, 540-3, 540-4, and 540-5 corresponding to an upper surface, a lower surface, a left surface, a right surface, and a rear surface of the inner wall 110 as a cube, excluding a font surface as the inlet of the cooking chamber 40. Also, microwaves may be emitted from the fourth branch points 520-1, 520-2, 520-3, 520-4, and 520-5 to which microwaves are spread along a four-branch pointed waveguide to the rooms 540-1, 540-2, 540-3, 540-4, and 540-5 through the holes 530-3' and 530-4' formed in the respective branch points 520-1, 520-2, 520-3, and 520-4.

Figure 5C:
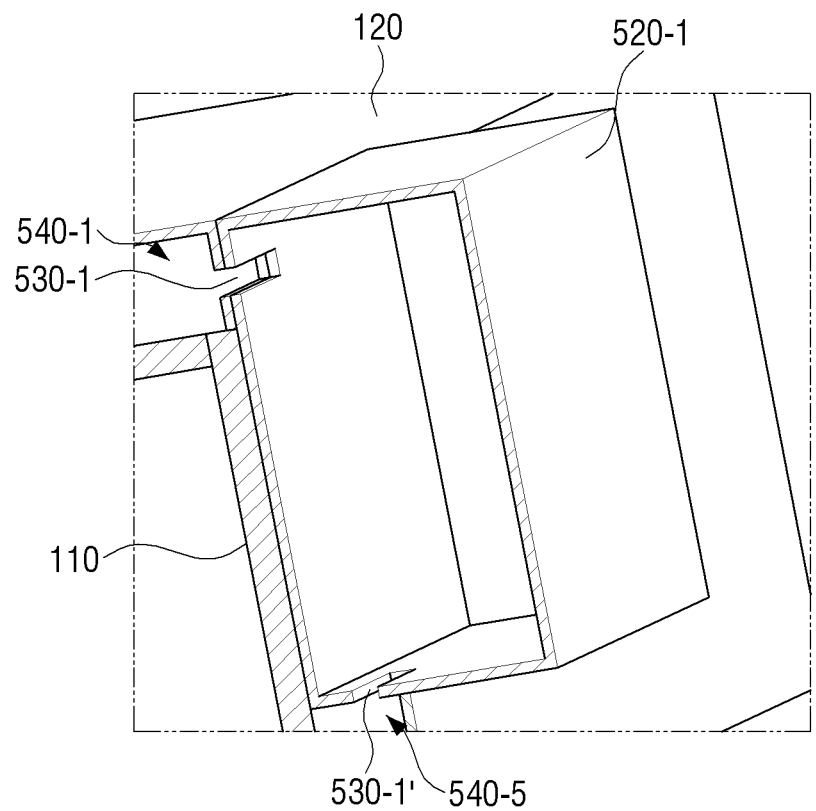

For more explanation, referring to FIG. 5C, FIG. 5C is an enlarged cross-sectional view of the cooking apparatus 100-8 with respect to the upper branch point 520-1.

Specifically, the branch point 520-1 is recessed inwardly, relative to the rear surface of the outer wall 120, and disposed at a position abut on the inner wall 110. The branch point 520-1 has a first hole 530-1 bored toward the room 540-1 corresponding to the upper surface of the inner wall 110 and a second hole 530-1' bored toward the room 540-5 corresponding to the rear surface of the inner wall 110.

In the cooking apparatus 100-8 according to the eighth exemplary embodiment as described above, microwaves generated by a microwave generating source, i.e., the microwave generating unit, located in a place, maybe evenly distributed to various spaces of the passage enclosing the inner wall 110. Further, in the cooking apparatus 100-8, the waveguide having various branch points for distributing microwaves to each space may be designed to have an efficient structure with respect to space.

Figure 5D:
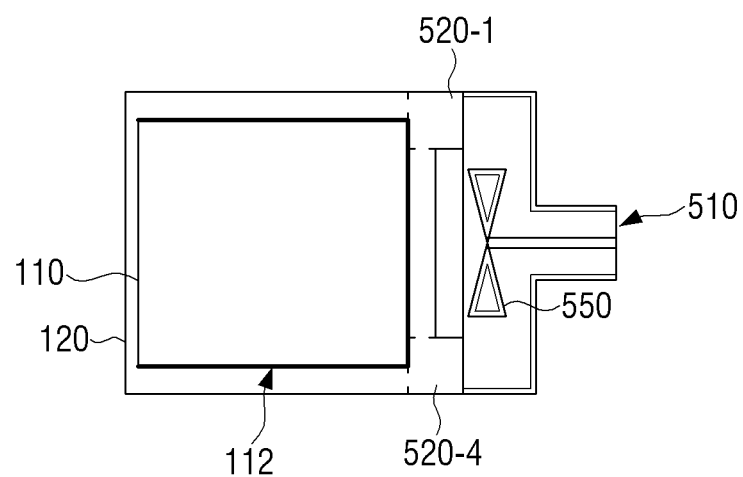

FIG. 5D is a view illustrating a configuration of a cooking apparatus 100-8' formed by adding a stirrer 550 to the cooking apparatus 100-8 of FIGS. 5A to 5C.

Referring to FIG. 5D, a stirrer 550 is disposed at the inlet 510 of the extended waveguide. The stirrer 550 may rotate to allow microwaves introduced from the inlet 510 to pass therethrough to be evenly distributed to each of the plurality of branch points 520-1 and 520-4. The stirrer 550 may be designed to block introduced microwaves when it stops rotation. Also, the stirrer 550 may be designed to control the amount of microwaves spreading to each of the plurality of branch points 520-1 to 520-4 according to a rotation speed thereof, after being introduced from the inlet 510.

FIG. 6 is a view illustrating a structure and a configuration of a cooking apparatus according to ninth and tenth exemplary embodiments of the present disclosure.

Figure 6A:
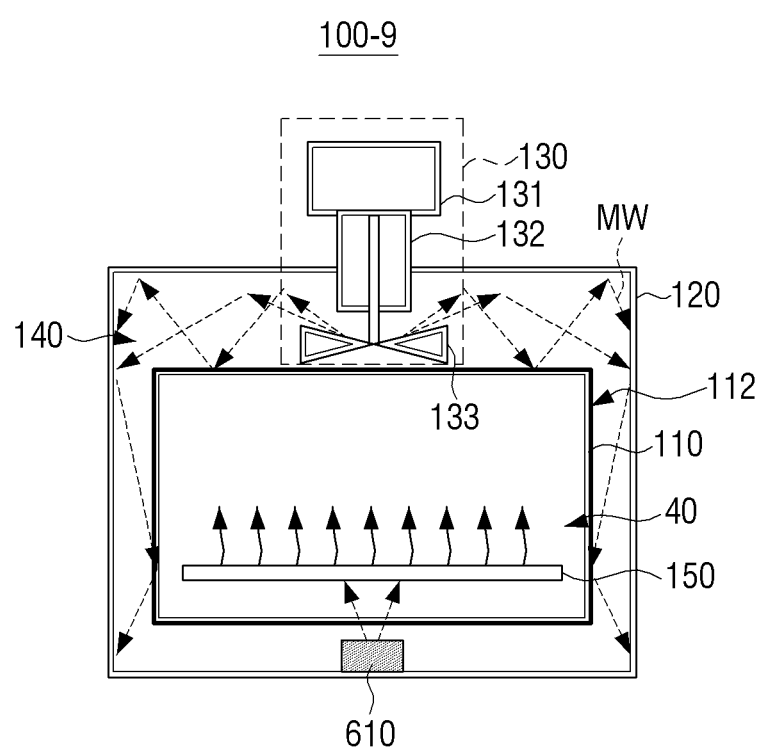
FIGS. 6A-6B are views illustrating a structure and a configuration of a cooking apparatus according to ninth and tenth exemplary embodiments of the present disclosure.
Figure 6B:
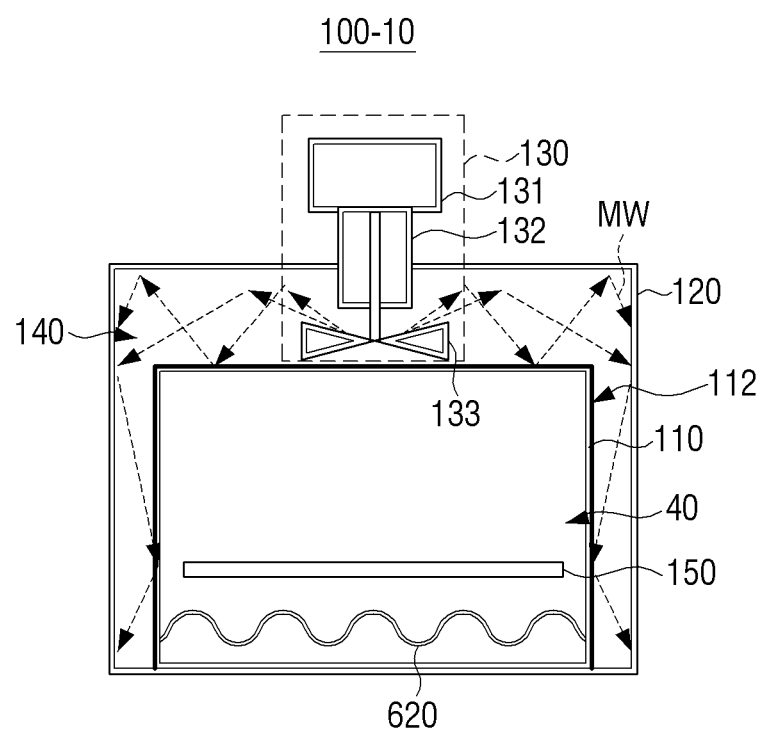

FIGS. 6a and 6b illustrate an exemplary embodiment for locally heating a cooking item. Referring to FIG. 6A, a cooking apparatus 100-9 according to the ninth exemplary embodiment includes an inner wall 110, an outer wall 120, an absorbent layer 112, a microwave generating unit 130, a shelf 150, and a second microwave generating unit 610. Structures and functions of the inner wall 110, the outer wall 120, the absorbent layer 112, and the microwave generating unit 130 are the same as those of the inner wall 110, the outer wall 120, the absorbent layer 112, and the microwave generating unit 130 of FIG. 2, and thus, redundant descriptions thereof will be omitted. In FIGS. 6A and 6B, as the microwave generating unit 130, the microwave generating unit 130 of the cooking apparatus 100-2 of the second exemplary embodiment illustrated in FIG. 3A is applied, but the present disclosure is not limited thereto. The microwave generating unit 130 may have various forms such as a magnetron, a klystron, an RF transistor, and the like, which emits microwaves.

The shelf 150 is provided in the cooking chamber 40. Specifically, the shelf 150 allowing to-be-cooked food to be placed thereon may be installed in the cooking chamber 40.

The shelf 150 absorbs microwaves. Specifically, the shelf may absorb wave energy of electromagnetic waves having a specific wavelength. Also, the shelf 150 emits heat energy. Specifically, the shelf 150 may convert energy of the absorbed microwaves into heat energy. Also, the shelf 150 may emit the converted heat energy in at least one of the modes of radiation, convection, and conduction. The shelf 150 may include an absorber for absorbing microwaves. The absorber may be formed of the same material as that of the absorbent layer 110. The shelf 150 may be manufactured by determining an appearance of the shelf and coating a shaped body formed of a material resistant to heat and impact with the absorber.

The second microwave generating unit 610 irradiates microwaves toward the shelf 150. Specifically, the second microwave generating unit 610 may generate microwaves separately from the microwave generating unit 130 and irradiate the generated microwaves to the shelf 150.

To separately irradiate microwaves to the shelf 150, the second microwave generating unit 610 may be located in a portion of the passage 40 below the shelf 150. Also, the bottom of the inner wall 110 may be provided with a region allowing microwaves to pass therethrough and a waveguide so that the microwaves emitted from the second microwave generating unit 610 may reach the shelf 150.

The cooking apparatus 100-9 of the ninth exemplary embodiment as described above may cook a bottom portion of a cooking item at a different temperature.

Referring to FIG. 5B, a cooking apparatus 100-10 according to the tenth exemplary embodiment includes an inner wall 110, an outer wall 120, an absorbent layer 112, a microwave generating unit 130, a shelf 150, and a heating line 620. Structures and functions of the inner wall 110, the outer wall 120, the absorbent layer 112, and the microwave generating unit 130 are the same as those of the inner wall 110, the outer wall 120, the absorbent layer 112, and the microwave generating unit 130 of FIG. 6A, and thus, redundant descriptions thereof will be omitted.

The cooking apparatus 100-10 of the tenth exemplary embodiment includes the heating line 620 for heating the shelf 150, unlike the cooking apparatus 100-9 of the ninth exemplary embodiment. The shelf 150 may be a shelf formed of a general durable and heat-resistant material. The heating line 620 may be a heat source which may be used in a general convection oven such as a nichrome wire.

The heating line 620 is installed at the bottom of the cooking chamber 40 and emits thermal energy. Specifically, the heating line 620 has electrical resistance and may convert power supplied to the heating line 620 into heat energy and releasing the converted heat to the outside.

The cooking apparatus 100-10 of the tenth exemplary embodiment may provide the separate heat source by the heating line as well as microwaves, and thus, the bottom portion of a cooking item may be cooked at a different temperature.

Figure 7:
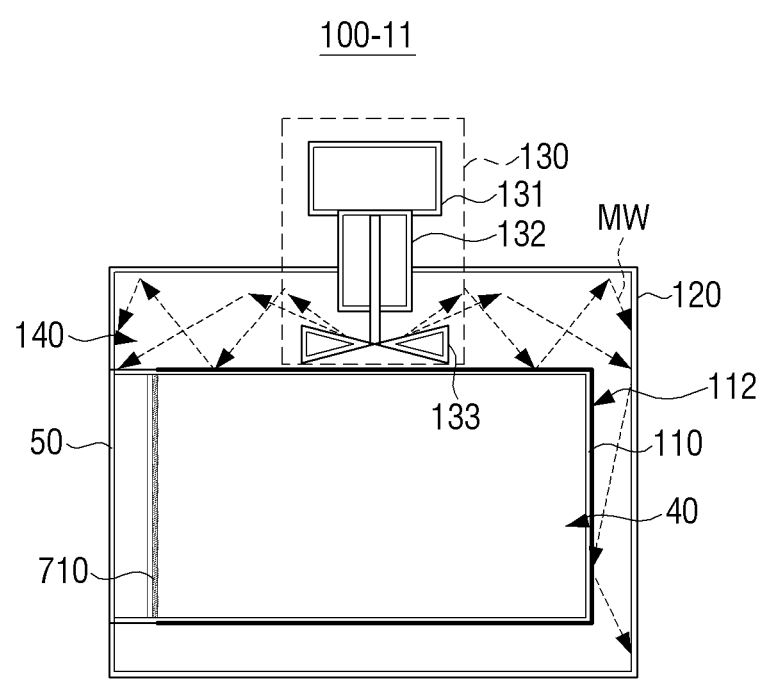
FIG. 7 is a view illustrating a structure and a configuration of a cooking apparatus according to an eleventh exemplary embodiment of the present disclosure.

FIG. 7 is a view illustrating a structure and a configuration of a cooking apparatus according to an eleventh exemplary embodiment of the present disclosure.

Referring to FIG. 7, a cooking apparatus 100-11 includes an inner wall 110, an outer wall 120, an absorbent layer 112, a microwave generating unit 130, and a door 50. Structures and functions of the inner wall 110, the outer wall 120, the absorbent layer 112 and the microwave generating unit 130 are the same as those of the inner wall 110, the outer wall 120, the absorbent layer 112, and the microwave generating unit 130 of FIG. 2, and thus, redundant descriptions thereof will be omitted. Meanwhile, in FIG. 6, the microwave generating unit 130 of the cooking apparatus 100-2 of the second exemplary embodiment including the microwave oscillator 131, the waveguide 132, and the stirrer 133 is illustrated, but the present disclosure is not limited thereto.

The door 50 opens and closes the cooking chamber 40. Specifically, the door 50 is disposed on one side of the cooking chamber 40 formed by the inner wall 110, so that the cooking chamber 40 may be opened and closed. The door (50) may be manufactured to be hermetically sealed so that heat of the cooking chamber is not leaked. The door 50 may be hinged to one side of the upper, lower, left, and right sides of the main body 30. The door 50 may be provided in plurality. The door 50 may be a drawer type door which has the shelf 150 attached thereto and slides in the cooking chamber 40.

The door 50 may include a transparent window. Specifically, the door 50 may include a window allowing visible light to be transmitted therethrough so that the user may check the inside of the cooking chamber 40.

The door 50 may reflect infrared rays. Specifically, the door 50 may include an infrared reflector 710 that reflects infrared rays. The infrared reflector 710 is formed of a transparent material and may be a heat insulation material that reflects most of the hit infrared rays when the infrared rays inside the cooking chamber 40 hit the infrared reflector 710.

The cooking apparatus 100-11 of the eleventh exemplary embodiment as described above may reduce heat loss to the outside of the cooking chamber 40 and secure a view to the inside of the cooking chamber 40.

Figure 8:
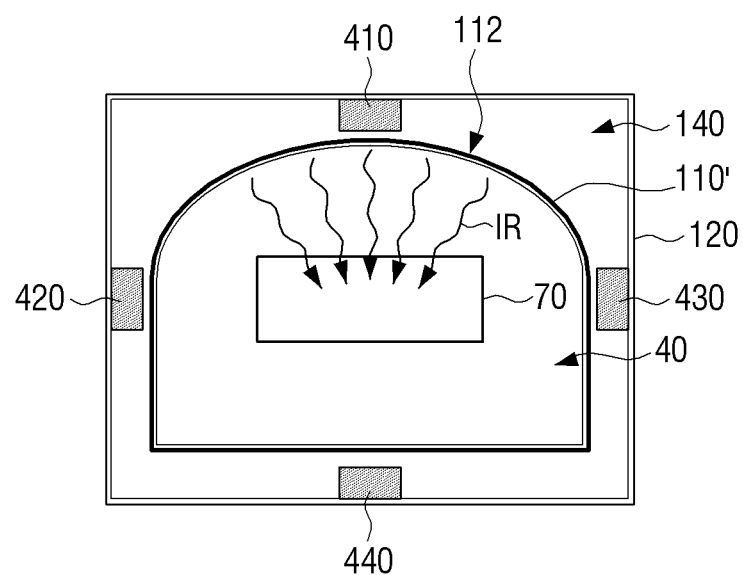
FIG. 8 is a view illustrating a structure and a configuration of a cooking apparatus according to a twelfth exemplary embodiment of the present disclosure.

FIG. 8 is a view illustrating a structure and a configuration of a cooking apparatus according to a twelfth exemplary embodiment of the present disclosure.

Referring to FIG. 8, a cooking apparatus 100-12 of the twelfth exemplary embodiment includes an inner wall 110', an outer wall 120, an absorbent layer 112, and microwave generating units 410, 420, 430, and 440. Here, structures and functions of the outer wall 120 and the absorbent layer 112 are the same as those of the outer wall 120 and the absorbent layer 112 of FIG. 2, and thus, redundant descriptions thereof will be omitted. The microwave generating units 410, 420, 430, and 440 are the same as the plurality of RF transistors 410, 420, 430, and 440 of the cooking apparatus 100-4 according to the fourth exemplary embodiment, but are not limited thereto. That is, the microwave generating units 410, 420, 430, and 440 of the cooking apparatus 100-12 of the twelfth exemplary embodiment may be implemented as a single RF transistor or the microwave generating unit 130 including the microwave oscillator 131.

The inner wall 110' forms the cooking chamber 40. Here, the inner wall 110' of the cooking apparatus 100-8 of the eighth exemplary embodiment configures a convex hemispherical ceiling. Accordingly, the absorbent layer 112 is applied to the inner wall 110' of the hemispherical ceiling to emit infrared rays.

The cooking apparatus 100-12 according to the twelfth exemplary embodiment as described above allows the radiation of infrared rays emitted to the cooking chamber 40 along the hemispherical or domed ceiling to be concentrated on the cooking item 70.

Figure 9:
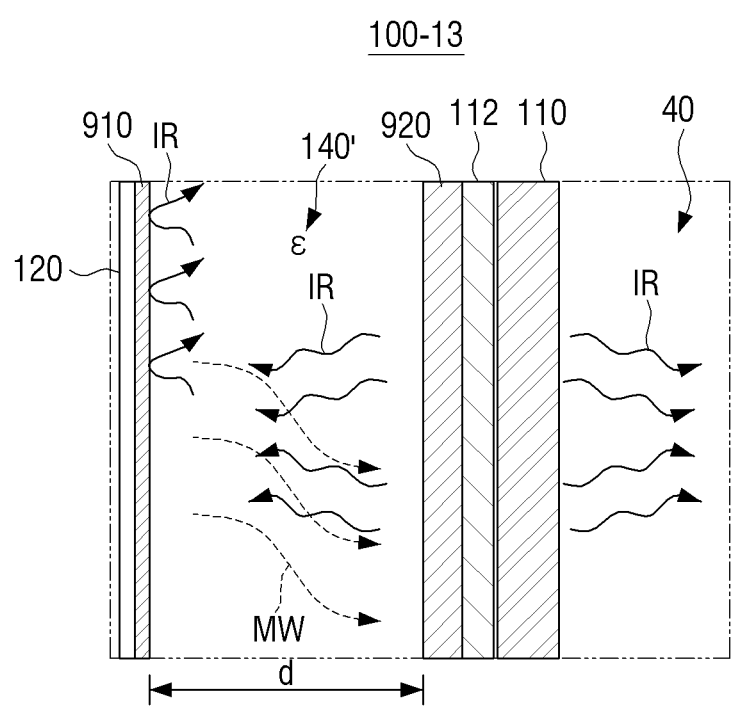
FIG. 9 is a view illustrating a structure and a configuration of a cooking apparatus according to a thirteenth exemplary embodiment of the present disclosure.

FIG. 9 is a view illustrating a structure and a configuration of a cooking apparatus according to a thirteenth exemplary embodiment of the present disclosure.

FIG. 9 is an enlarged cross-sectional view illustrating the outer wall 120, the passage 140', the inner wall 110, and the cooking chamber 40 in order from left to right.

The outer wall 120 may further include an infrared reflecting layer 910 capable of reflecting infrared rays (IR). Specifically, the outer wall 120 may further include the infrared reflective layer 910 for reflecting infrared rays to a surface of the outer wall 120 in a direction of the passage 140'. The infrared reflecting layer 910 may be configured to reflect the infrared rays IR, which are emitted from the absorbent layer 112 and oriented toward the outer wall 120', to the cooking chamber 40.

The passage 140', a space between the outer wall 120 and the inner wall 110, is filled with a dielectric material having a predetermined permittivity (s). Electromagnetic waves passing through dielectric materials with different permittivities change in speed. That is, when microwaves MW pass through air and other medium, a length of a wavelength thereof changes.

The width d of the passage 140' may be determined according to wavelengths of microwaves spread in the passage 140'. For example, In case where a 2.45 GHz microwave used in a general home cooking appliance conforming to the ISM (industrial scientific and medical) band is used, the width d of the passage 140' may be designed to be about 3 cm to ensure good spreading efficiency of microwaves.

If the passage 140' is filled with a dielectric material having a predetermined permittivity (s), a wavelength of electromagnetic waves spreading through the passage 140' is shortened, and thus, a manufacturer may design the width d of the passage 140' to be narrower, while maintaining performance of guiding microwaves in the passage 140'.

The inner wall 110 includes a plurality of laminated plates. Specifically, the inner wall 110 is a base substrate determining a shape of the cooking chamber and one or a plurality of layers are stacked on the base substrate.

The base substrate 110 may be formed of a material having a high emissivity with respect to infrared rays (IR) emitted from the absorbent layer 112. Specifically, for energy efficiency, the base substrate 110 may be formed of a ceramic-like material whose proportion (emissivity) of electromagnetic waves emitted therefrom to electromagnetic waves which have been absorbed thereby is high.

The absorbent layer 112 may be applied to the inner wall 110. A surface protection layer 820 may be formed on the absorbent layer 112. Specifically, the surface protection layer 820 may be disposed on the top of the absorbent layer 112 in a direction of the passage 140'.

The absorbent layer 112 is formed on the top of the inner wall 110, i.e., on a surface facing the outer wall 120. Briefly, the microwave absorbent layer 112 is stacked on the inner wall 110. The microwave absorbent layer 112 is composed of a component having reactivity to an electric field and a magnetic field. Specifically, the microwave absorbent layer 112 has a characteristic of absorbing microwaves MW and emitting infrared rays (IR). The microwave absorbent layer 112 may be formed by applying a compound obtained by mixing metallic powder and an inorganic binder to the base substrate 110. Here, the metallic powder may include at least one of Ca, $Al_2O_3$, ZnO, FeO, $Fe_2O_3$, $TiO_2$, SiC, WC, Co, and carbon steel.

The surface protective layer 920 is stacked on the microwave absorbent layer 112. The surface protection layer 920 is formed of a material allowing microwaves MW to be transmitted therethrough so that the microwaves MW may reach the absorbent layer 112. For example, the surface protection layer 920 may be formed of a non-metallic material having high permeability to electromagnetic waves. Meanwhile, the surface protection layer 920 may be formed of a material that reflects infrared rays (IR). Specifically, the surface protection layer 820 may include a component of an insulating material which covers the absorbent layer 112, allows microwaves MW to be transmitted therethrough to penetrate into absorbent layer 112, and reflects infrared rays IR oriented in a direction opposite to the cooking chamber 40 to return the infrared rays to the cooking chamber 40.

The cooking apparatus 100-13 of the thirteenth exemplary embodiment as described above may achieve miniaturization of the cooking apparatus and high energy efficiency.

Figure 10:
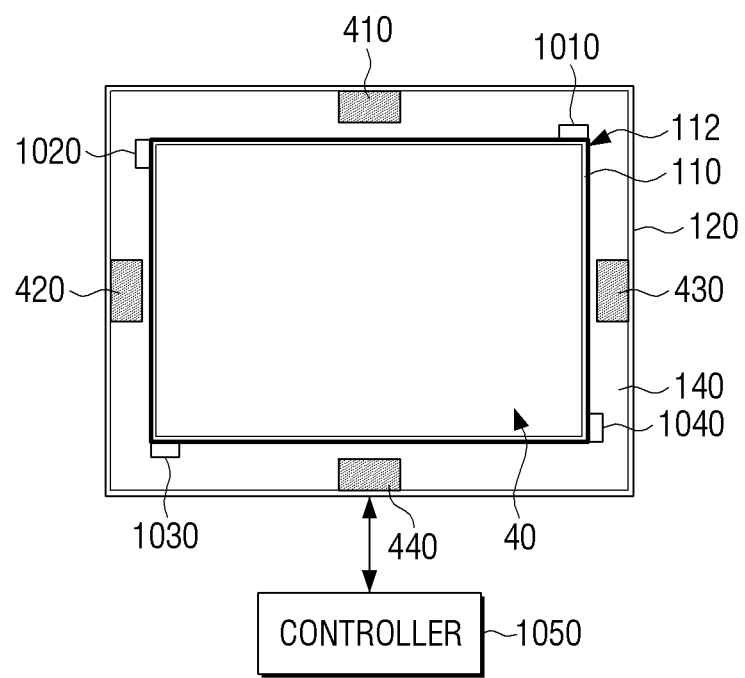
FIG. 10 is a view illustrating a structure and a configuration of a cooking apparatus according to a fourteenth exemplary embodiment of the present disclosure.

FIG. 10 is a view illustrating a structure and a configuration of a cooking apparatus according to a fourteenth exemplary embodiment of the present disclosure.

Referring to FIG. 10, a cooking apparatus 100-14 of the fourteenth exemplary embodiment includes an inner wall 110, an outer wall 120, an absorbent layer 112, a plurality of RF transistors 410, 420, 430, and 440, a plurality of temperature sensors 1010, 1020, 1030, and 1040, and a controller 1050. Here, structures and functions of the inner wall 110, the outer wall 120, the absorbent layer 112, and the plurality of RF transistors 410, 420, 430, and 440 are the same as those of the inner wall 110, the outer wall 120, the absorbent layer 112, and the plurality of RF transistors 410, 420, 430, and 440 of the cooking apparatus 100-5 of the fifth exemplary embodiment of FIG. 4A, and thus, redundant descriptions thereof will be omitted.

The temperature sensors 1010, 1020, 1030, and 1040 sense a temperature of the inner wall 110. Specifically, the temperature sensors 1010, 1020, 1030, and 1040 maybe installed in various places of the inner wall 110 and sense the temperature on the inner wall 110 at the installed position. The temperature sensors 1010, 1020, 1030, and 1040 transmit information about a sensed temperature to the controller 1050.

The controller 1050 controls the plurality of RF transistors 410, 420, 430, and 440. Specifically, the controller 1050 may control the plurality of RF transistors 410, 420, 430, and 440 based on sensing results from the temperature sensors 1010, 1020, 1030, and 1040. In an example, the controller 1050 stores positions of the temperature sensors 1010, 1020, 1030, and 1040 installed in the inner wall 110 and positions of the plurality of RF transistors 410, 420, 430, and 440. The controller 1050 receives sensing results from the temperature sensors 1010, 1020, 1030, and 1040. The controller 1050 may adjust output intensity of the plurality of RF transistors 410, 420, 430, and 440 based on the sensed temperature. Specifically, the controller 1050 may identify from which of the temperature sensors a signal of the received sensed temperature has been received as information, and adjust intensity of microwaves of the RF transistors 410, 420, 430, and 440 corresponding to installation positions of the identified temperature sensors 1010, 1020, 1030, and 1040. In an example, the controller 1050 may adjust intensity of microwaves by controlling a gain value of each of the RF transistors 410, 420, 430, and 440.

The controller 1050 may control the plurality of RF transistors 410, 420, 430, and 440 so that a wavelength of microwaves may change within a predetermined range. Specifically, the controller 1050 may vary the wavelength of microwaves emitted from the plurality of RF transistors 410, 420, 430, and 440 within a predetermined range.

As the microwaves emitted from the positions where the RF transistors 410, 420, 430, and 440 are installed spread in the passage 140, a mode in which energy is concentrated in a specific space may be formed. Since microwave energy is concentrated on the position where the hot spot is generated by the mode, high heating may occur locally. Thus, if the wavelength of microwaves is varied within a predetermined range, particularly, within an allowable deviation of the ISM band, the cooking chamber 40 may be heated evenly.

In an example, the controller 1050 may control impedance values of the RF transistors 410, 420, 430, and 440 to change the wavelength of microwaves.

The cooking apparatus 100-14 of the fourteenth exemplary embodiment as described above may heat the cooking chamber evenly.

Figure 11:
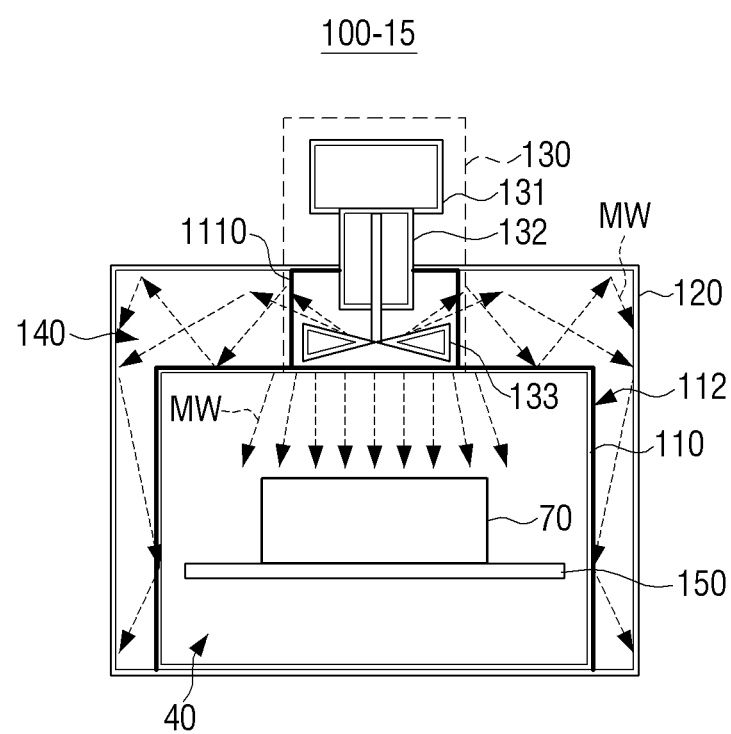
FIG. 11 is a view illustrating a structure and a configuration of a cooking apparatus according to a fifteenth exemplary embodiment of the present disclosure.

FIG. 11 is a view illustrating a structure and a configuration of a cooking apparatus according to a fifteenth exemplary embodiment of the present disclosure.

Referring to FIG. 11, the cooking apparatus 100-15 includes an inner wall 110, an outer wall 120, an absorbent layer 112, a microwave generating unit 130, a shelf 150, and a valve 1110. Here, structures and functions of the inner wall 110, the outer wall 120, the absorbent layer 112, the microwave generating unit 130, and the shelf 150 are the same as those of the inner wall 110, the outer wall 120, the absorbent layer 112, the microwave generating unit 130, and the shelf 150 of FIG. 2, and thus, redundant descriptions thereof will be omitted. Meanwhile, it is illustrated that the microwave generating unit 130 includes the microwave oscillator 131, but the present disclosure is not limited thereto. Also, it is illustrated that the inner wall 110 has a rectangular cross-sectional shape but is not limited thereto and may be replaced with the inner wall 110' having a hemispherical ceiling of the cooking apparatus 100-12 of the twelfth exemplary embodiment.

The valve 1110 switches a spreading path of emitted microwaves MW. Specifically, the valve 1110 may cause microwaves MW emitted from the microwave generating unit 130 to be spread toward either the passage 140 or the cooking chamber 40. That is, in an operation mode in which the cooking item 70 is heated by infrared rays emitted from the absorbent layer 112, the valve 1110 causes microwaves MW to be spread toward the passage 140. Also, in another operation mode in which microwaves MW is irradiated directly to the cooking item 70 to heat the same, the valve 1110 causes microwaves MW to be spread toward the cooking chamber 40.

The valve 1110 may be positioned at an end of the microwave generating unit 130 in which microwaves MW are emitted. In addition, the valve 1110 may be implemented in various structures that may switchably open and shut off one side path in a direction of the passage 140 and the other side path in a direction of the cooking chamber. For example, the valve 1110 may be implemented as a hingeable vent.

The cooking apparatus 100-15 of the fifteenth exemplary embodiment as described above may provide a microwave oven scheme-based heat source as well as an infrared heating scheme.

FIG. 12 is a view illustrating structures of a slot antenna according to various exemplary embodiments of the present disclosure.

Figure 12A:
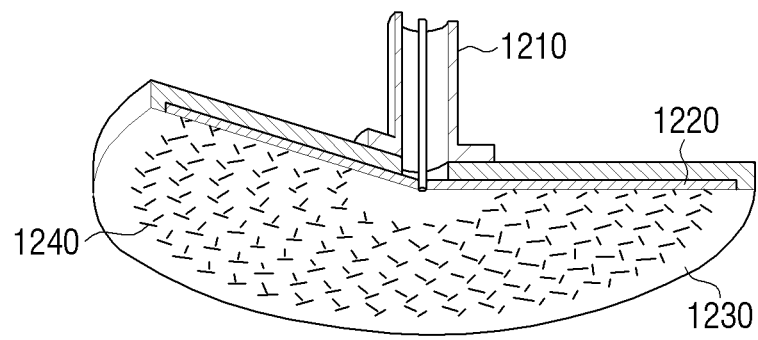
FIGS. 12A-12D are views illustrating structures of a slot antenna according to various exemplary embodiments of the present disclosure.
Figure 12A:
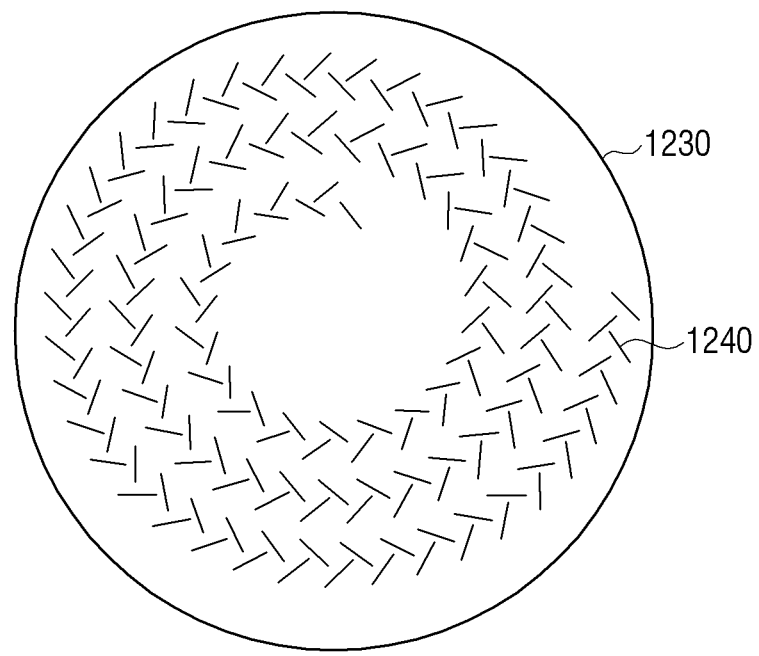

Referring to FIG. 12A, an example of a stirrer is illustrated. Specifically, (a) of FIG. 12A illustrates a perspective cross-sectional view of the stirrer 133, and (b) FIG. 12A illustrates a bottom view. The stirrer 133 is configured as RLSA (Radial Line Slot Antenna). Specifically, the stirrer 133 includes a coaxial waveguide 1210, a dielectric plate 1220, and a conductive plate 1230 on which line slots 1240 are formed.

The coaxial waveguide 1210 guides microwaves generated by the microwave oscillator 131 to the dielectric plate 1220.

The dielectric plate 1220 has a predetermined permittivity. A shape of the conductive plate 1230 may be circular or elliptical according to the isotropic or anisotropic nature of dielectric used in the dielectric plate 1220. The dielectric plate 1220 is covered with a metal conductive layer.

The conductive plate 1230 is a metal plate covering the entire surface of the dielectric plate 1220. A plurality of line slots 1240 are formed in the conductive plate 1230. The plurality of line slots 1240 are arranged spirally with respect to the center of the conductive plate 1230.

The plurality of line slots 1240 may be formed such that longitudinal directions of two slots disposed in a spiral direction intersect with each other at an angle of 90 degrees. The shape of the line slots 1240 is illustrative and not restrictive.

The cooking apparatus using the circular antenna as the stirrer 133 described above may radiate uniform electromagnetic waves to the surface of the absorbent layer 112.

The line slot 1240 formed on the conductive plate 1230 may be implemented as the slot antenna 320 formed in the partition 310 of the cooking apparatus 100-3 according to the third exemplary embodiment of FIG. 3B. That is, the slot antennas 320-1, 320-2, and 320-3 formed at the plurality of positions of the partition 310 maybe implemented with the RLSA pattern as illustrated in (b) of FIG. 12A.

Figure 12B:
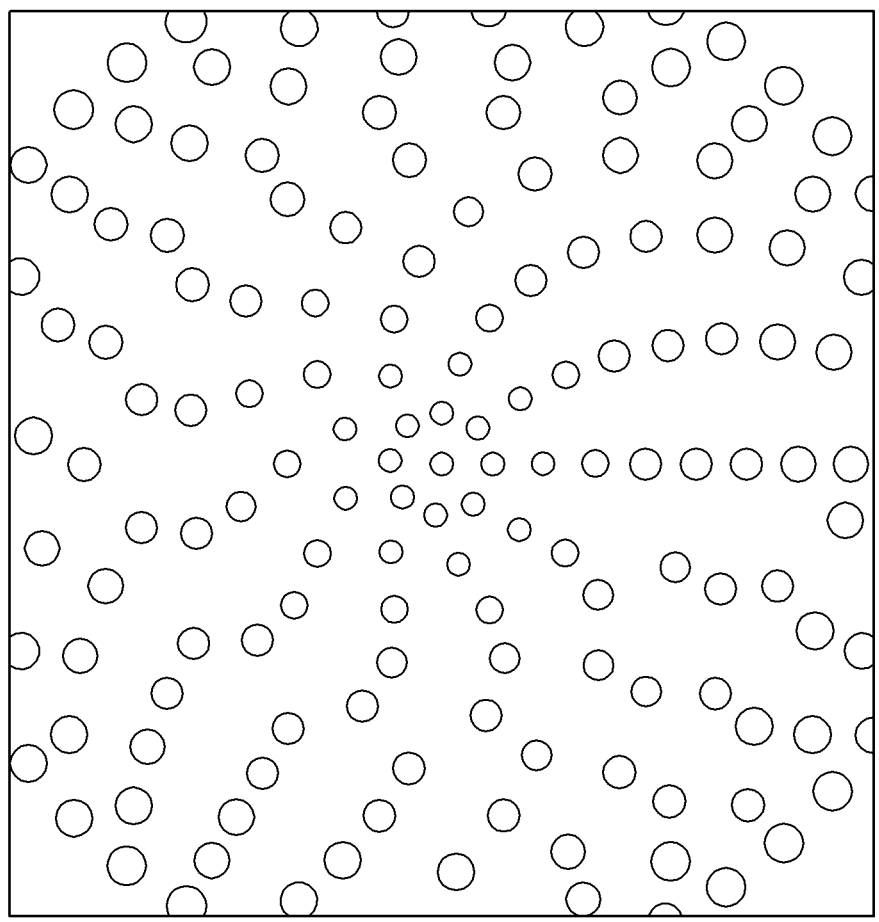

FIG. 12B illustrates another pattern of the slot antenna 320-1 formed in the partition 310. Specifically, the slot antenna 320-1 includes slots of different sizes arranged along a radial pattern. In the radial pattern as illustrated, positions of the concentrically arranged slots rotate in a direction away from the center. Also, the size of the slots increases in a direction away from the center. This is because an outlet of microwave generating unit 130 from which microwaves are emitted is positioned to face the center of the slot antenna 320-1. The slots in central portion at which microwaves arrive immediately may be relatively small and slots in positions far from the center may be relatively large to make microwaves reaching the absorbent layer 112 of the inner wall 110 uniform.

Figure 12C:
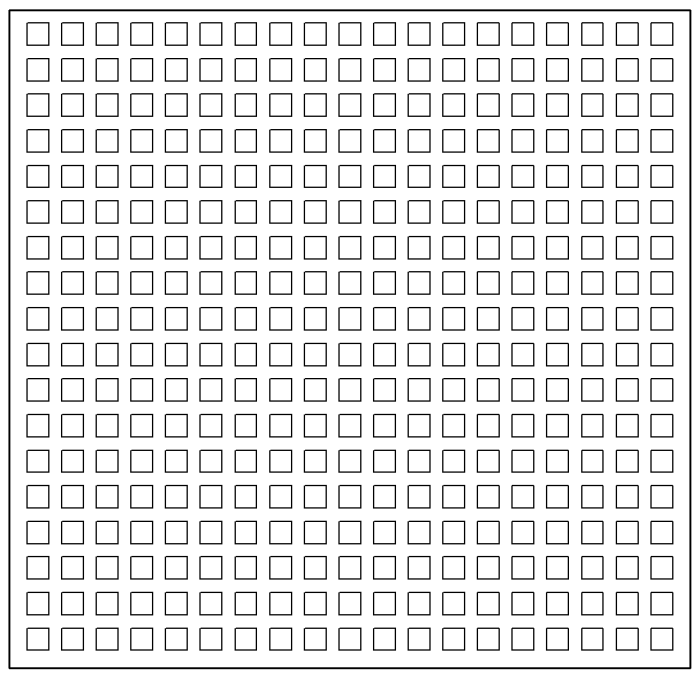

FIG. 12C illustrates another pattern of the slot antenna 320-2 formed in the partition 310. Specifically, slot antenna 320-2 includes slots of uniform size arranged in a lattice-like pattern. The square slots provide ease of manufacturing of the slot antenna 320-2 and ease of design of slot sizes such as a reach to the microwave absorbent layer.

Figure 12D:
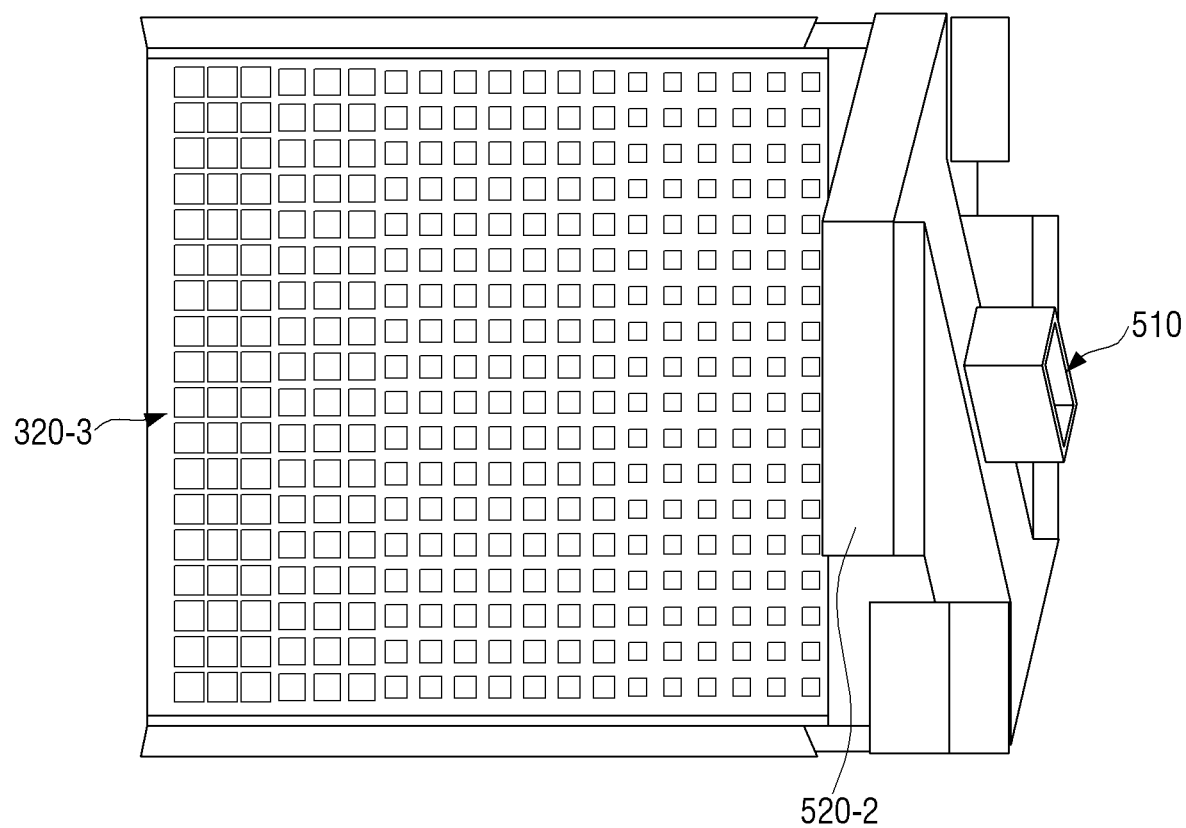

FIG. 12D illustrates a cooking apparatus 100-8" formed by adding the partition 310 of the cooking apparatus 100-3 according to the third exemplary embodiment of FIG. 3B to the cooking apparatus 100-8 of the eighth exemplary embodiment of FIG. 5.

FIG. 12D illustrates that the slot antennas 320-3 of the partition 310 are visible by removing one side of the outer wall 120 of the cooking apparatus 100-8" for the sake of convenience of description.

The slot antenna 320-3 includes a plurality of slots of a non-uniform size arranged in a lattice pattern. Specifically, microwaves generated by a microwave generating unit (not shown) enter the inlet 510 of the extended waveguide and are emitted to the passage through a hole (not shown) formed at each branch point 520-2. The slots located near the hole of the branch point 520-2 to which microwaves are emitted are relatively small in size, while the slots located far away therefrom are relatively large in size. The slot antenna 320-3 may control the amount of microwaves reaching the absorbent layer of the inner wall equal, thus evenly heating the cooking chamber.

Figure 13:
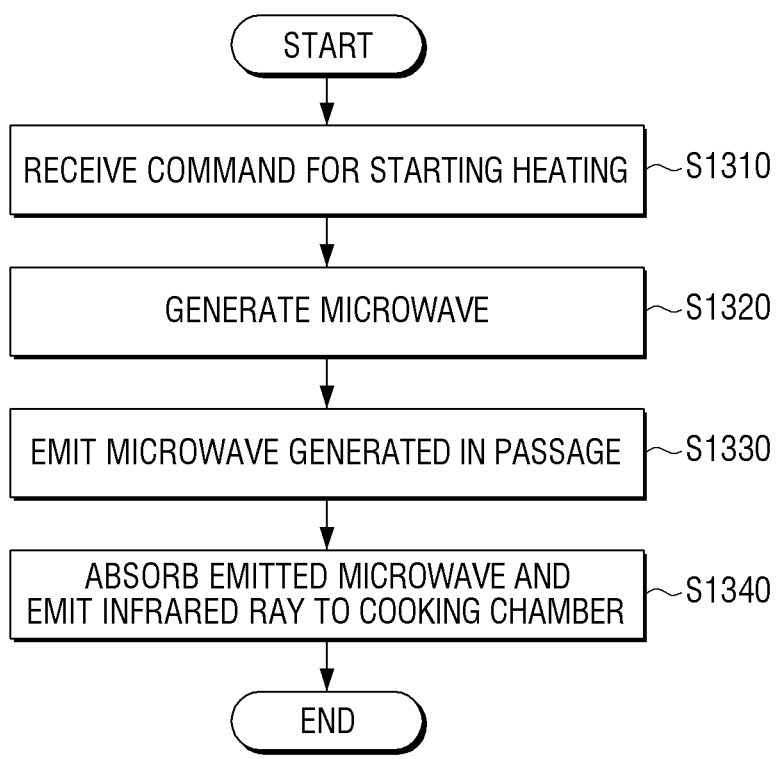
FIG. 13 is a flowchart illustrating a method of controlling a cooking apparatus according to an exemplary embodiment of the present disclosure.

FIG. 13 is a flowchart illustrating a method of controlling a cooking apparatus according to an exemplary embodiment of the present disclosure.

Referring to FIG. 13, an instruction to start heating a cooking chamber is received (S1310). Specifically, a cooking apparatus may receive a cooking start instruction corresponding to a user input to the operating unit. Instructions to start heating of the cooking chamber include heating for cooking, heating for cleaning, preheating, and the like.

Next, microwaves are generated (S1320). Specifically, the cooking apparatus may generate microwaves in response to an instruction for starting heating. Here, a method of generating microwaves may be a method using a magnetron for rotating electrons at a high speed or a method of using an RF solid-state device including a semiconductor device such as a PIN diode, a field effect transistor, and the like.

Here, a wavelength of the generated microwaves may vary within a predetermined range. Specifically, the cooking apparatus may continuously change the wavelength of the generated microwaves, so that a position of a hot spot on which energy of the microwaves spread and reflected in the passage is concentrated is varied (so that formation of the mode is suppressed).

Then, microwaves generated in the passage are released (S1330). Specifically, the cooking apparatus may emit microwaves generated in the passage, a space enclosed by the inner wall forming the cooking chamber and the outer wall enclosing the inner wall. The emitted microwaves are spread along the passage.

Next, the emitted microwaves are absorbed to emit infrared rays to the cooking chamber (S1340). Specifically, in the cooking apparatus, the microwaves emitted from the passage maybe absorbed by the absorber of the passage and infrared rays maybe emitted to the cooking chamber by the absorber which has absorbed microwave energy.

Meanwhile, the foregoing control method may further include a step of sensing a temperature of a plurality of positions previously installed on the inner wall. Specifically, the cooking apparatus may include a plurality of temperature sensors provided on the inner wall to sense a temperature of places in the cooking chamber.

Intensity of microwaves in step S1330 may be adjusted based on the sensed temperature. Specifically, the cooking apparatus may adjust intensity of microwaves emitted from each of the microwave generating devices in different positions based on a sensed temperature of each position.

Meanwhile, the foregoing control method may further include a step of receiving a user's heating mode input and a step of switching a path to which microwaves are emitted in step S1330 to either the passage or the cooking chamber in response to the heating mode input.

As described above, the method for controlling a cooking apparatus according to an exemplary embodiment may provide high energy efficiency and cooking performance by infrared heating. Also, the control method of FIG. 13 may be implemented in the cooking apparatus having the configuration of FIGS. 2 to 11.

In addition, the method for controlling a cooking apparatus as described above maybe implemented by at least one execution program for executing the control method as described above, and the execution program may be stored in a computer-readable recording medium.

Accordingly, each block of the present disclosure may be embodied as a computer-writable code on a computer-readable recording medium. The computer-readable recording medium may be a device capable of storing data that can be read by a computer system.

For example, the computer-readable recording medium may be a ROM, a RAM, a CD-ROM, a magnetic tape, a floppy disk, an optical disk, an optical data storage device, and a video display device such as a television including the storage device. In addition, the computer-readable code maybe embodied as a computer data signal of a carrier wave.

Although the exemplary embodiments have been illustrated and described hereinabove, the present disclosure is not limited to the above-mentioned specific exemplary embodiments, but may be variously modified by those skilled in the art without departing from the scope and spirit of the present disclosure as disclosed in the accompanying claims. These modifications should also be understood to fall within the scope of the present disclosure.

The invention claimed is:

1. A cooking apparatus comprising:
   an inner wall forming a cooking chamber;
   an outer wall enclosing the inner wall;
   a microwave generating unit configured to emit microwaves to a passage as a space enclosed by the inner wall and the outer wall so that the microwaves emitted by the microwave generating unit are reflected by the inner wall and the outer wall and are contained within the passage;
   a plurality of temperature sensors installed in a plurality of positions of the inner wall and configured to sense a temperature from the plurality of positions;
   a controller configured to control the microwave generating unit to adjust an intensity of the microwaves emitted based on the temperature sensed by the plurality of temperature sensors; and
   an absorbent layer, applied to a surface of the inner wall facing the outer wall, configured to absorb the microwaves spread along the passage and to emit infrared rays to the cooking chamber.

2. The cooking apparatus as claimed in claim 1, further comprising:
   a surface protective layer formed of a material to allow the microwaves to be transmitted therethrough and to reflect the infrared rays, disposed on an upper portion of the absorbent layer.

3. The cooking apparatus as claimed in claim 1, further comprising:
   an infrared reflective plate configured to reflect the infrared rays to a surface of the inner wall facing the passage.

4. The cooking apparatus as claimed in claim 1, wherein the microwave generating unit includes:
   a microwave oscillator configured to acceleratedly move electrons using an electric field;
   a waveguide configured to guide microwaves generated by the accelerated motion to the passage; and
   a stirrer configured to reflect the microwaves guided to the passage laterally in the passage between the outer wall and the inner wall.

5. The cooking apparatus as claimed in claim 1, further comprising:
   a variable element configured to change a characteristic impedance of the passage in which the microwaves are spread.

6. The cooking apparatus as claimed in claim 1, wherein the microwave generating unit includes a waveguide branched to different paths to guide the microwaves emitted from a generation source of the microwaves to different spaces of the passage.

7. The cooking apparatus as claimed in claim 6, wherein the passage is divided into a plurality of rooms enclosing the inner wall, and the waveguide is branched to spaces of a boundary portion in which two or more of the plurality of rooms abut each other, and two or more holes allowing the microwaves to spread therethrough to each of the two or more of the plurality of rooms abutting each other are formed.

8. The cooking apparatus as claimed in claim 1, wherein the microwave generating unit includes a radio frequency (RF) transistor configured to emit microwaves.

9. The cooking apparatus as claimed in claim 8, wherein the controller is configured to control the RF transistor to change a wavelength of the microwaves within a predetermined range.

10. The cooking apparatus as claimed in claim 8, wherein the RF transistor is provided in plurality, and the plurality of RF transistors are disposed in different spaces within the passage, and the controller is configured to control the plurality of RF transistors to emit microwaves having different intensities according to spaces in which the plurality of RF transistors are positioned.

11. The cooking apparatus as claimed in claim 8, wherein the controller is configured to control the RF transistor to adjust an intensity of the microwaves emitted by the microwave generating unit based on the temperature sensed by the plurality of temperature sensors.

12. The cooking apparatus as claimed in claim 1, further comprising: a partition positioned between the inner wall and the outer wall to guide the microwaves emitted by the microwave generating unit to an end of the passage together with the outer wall,
   wherein the partition includes one or a plurality of slots to allow the guided microwaves to pass therethrough to the absorbent layer.

13. The cooking apparatus as claimed in claim 12, wherein the partition includes a slot antenna including a plurality of slots having a uniform or non-uniform size arranged according to predetermined patterns.

14. The cooking apparatus as claimed in claim 13, wherein the slot antenna includes a plurality of slots increased in size in a direction away from a position from which the microwaves are emitted to the passage, according to a radial or lattice-like pattern.

* * * * *